United States Patent
Anchan et al.

(10) Patent No.: US 11,122,480 B2
(45) Date of Patent: Sep. 14, 2021

(54) MULTIMEDIA SESSION CONTINUITY AND DOMAIN SELECTION BASED ON USER EQUIPMENT LEARNING AND HISTORY

(71) Applicant: QUALCOMM Incorporated, San Diego, CA (US)

(72) Inventors: Kirankumar Bhoja Anchan, San Diego, CA (US); Srinivasan Balasubramanian, San Diego, CA (US); Shyamal Ramachandran, San Diego, CA (US); Chinmay Dhodapkar, San Diego, CA (US); Devrath Chatterjee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/960,889

(22) Filed: Apr. 24, 2018

(65) Prior Publication Data

US 2018/0352489 A1    Dec. 6, 2018

Related U.S. Application Data

(60) Provisional application No. 62/514,622, filed on Jun. 2, 2017.

(51) Int. Cl.
*H04W 36/08* (2009.01)
*H04W 36/00* (2009.01)
(Continued)

(52) U.S. Cl.
CPC ....... *H04W 36/08* (2013.01); *H04W 36/0083* (2013.01); *H04W 36/245* (2013.01); *H04W 48/16* (2013.01); *H04W 48/20* (2013.01)

(58) Field of Classification Search
None
See application file for complete search history.

(56) References Cited

U.S. PATENT DOCUMENTS 8,089,939 B1 *  1/2012  Mater ................. H04W 36/30
                                                  370/332
8,923,116 B1   12/2014  Seleznyov
(Continued)

FOREIGN PATENT DOCUMENTS

EP     2 398 293 A1    12/2011

OTHER PUBLICATIONS

International Search Report and Written Opinion—PCT/US2018/029440—ISA/EPO—dated Jul. 3, 2018 15 pages.

*Primary Examiner* — Ruihua Zhang
(74) *Attorney, Agent, or Firm* — Arent Fox, LLP

(57) ABSTRACT

A method and apparatus for selecting an access point (AP) for providing a service at a user equipment (UE). The example method may identify, by a user equipment (UE), a first AP available for communication. The example method may determine, by the UE, whether the first AP is suitable based, at least in part, on an indication for the first AP in an AP history table stored in a memory of the UE, wherein the indication is based on UE-determined metrics determined during one or more prior communications between the UE and the first AP. The example method may also include establishing communication between the UE and the first AP, in response to determining that the first AP is suitable.

29 Claims, 21 Drawing Sheets

(51) Int. Cl.
*H04W 36/24* (2009.01)
*H04W 48/16* (2009.01)
*H04W 48/20* (2009.01)

(56) References Cited

U.S. PATENT DOCUMENTS

| | | | |
|---|---|---|---|
| 9,877,251 B2* | 1/2018 | Stager | H04W 84/005 |
| 2005/0286466 A1* | 12/2005 | Tagg | H04L 12/2856 |
| | | | 370/329 |
| 2007/0249291 A1* | 10/2007 | Nanda | H04W 36/0083 |
| | | | 455/73 |
| 2010/0054179 A1* | 3/2010 | Meyer | H04W 48/20 |
| | | | 370/328 |
| 2013/0078977 A1* | 3/2013 | Anderson | H04B 1/005 |
| | | | 455/418 |
| 2013/0183965 A1 | 7/2013 | Ramachandran et al. | |
| 2015/0257062 A1* | 9/2015 | Hara | H04W 36/0085 |
| | | | 370/331 |
| 2016/0050599 A1 | 2/2016 | Yang et al. | |
| 2017/0070919 A1 | 3/2017 | Verger et al. | |
| 2017/0331577 A1 | 11/2017 | Parkvall et al. | |
| 2018/0352493 A1* | 12/2018 | Strater | H04W 36/0058 |

* cited by examiner

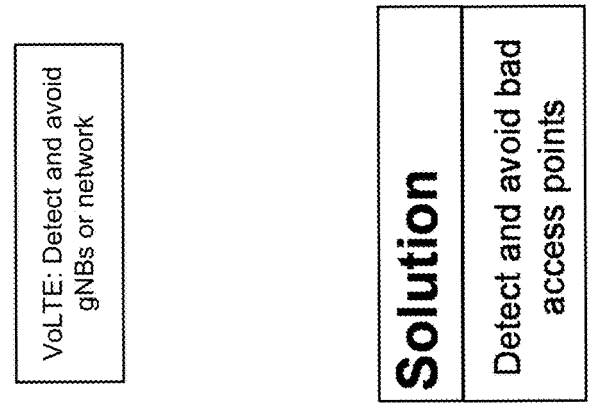
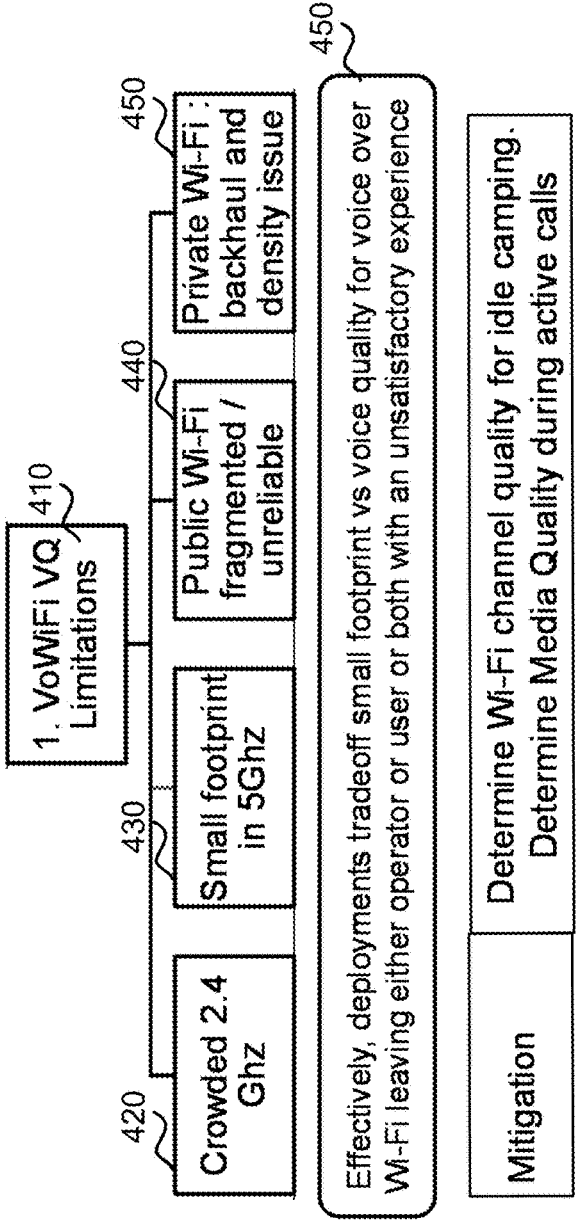
FIG. 4

| eNB cluster | Input from last call | | | Inference | | | | | Time | | Colocated WiFi information | Collocated iRAT Cluster | WiFi quality With VoWiFi (Collocated network quality) | Confidence of call continuity on WiFi | Mobility Etc. |
|---|---|---|---|---|---|---|---|---|---|---|---|---|---|---|---|
| | Last call stats | | | Cumulative Grade | List type | Instance count | Demote trigger | | Last used | Last failed attempt to camp | | | | | |
| | MAC-METRIC | Media | | | | | | | | | | | | | |
| Home | Good | Good | | 15 | Gold | 5 | | | UTC time | - | Home BSSIDs | Home cluster | Good | 1 | low |
| Car parking | Bad | bad | | 7 | Black | 5 | 3 | | UTC time | - | None | Office | None | 0 | High |
| Office | Good | Good | | 14 | White | 5 | | | UTC time | - | Office BSSIDs | Office | Average | 0.5 | low |
| Coffee | Good | Bad | | 10 | Grey | | | | UTC time | - | Coffee BSSIDs | Route | Good | 1 | low |
| Mall | Bad | Bad | | 5 | Black | 5 | 1 | | UTC time | - | PLMN1, cell id 4 | Route 2 | Good | 1 | medium |
| Park | Bad | Bad | | 6 | Bronze | | | | UTC time | - | PLMN1, cell id 5 | Route 3 | Good | 1 | medium |

MULTIMEDIA SESSION CONTINUITY AND DOMAIN SELECTION BASED ON USER EQUIPMENT LEARNING AND HISTORY

CROSS-REFERENCE TO RELATED APPLICATIONS

The present application for patent claims priority to Provisional Application No. 62/514,622 entitled "Multimedia Session Continuity and Domain Selection Based on User Equipment Learning and History" filed Jun. 2, 2017, which is assigned to the assignee, and incorporated herein by reference in its entirety.

BACKGROUND

Aspects of the present disclosure relate generally to wireless communication networks, and more particularly, to a voice call or a video telephony (VT) continuity in a radio wireless communication system.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications regarding mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, some access points (APs), e.g., LTE/NR or Wi-Fi APs, may poorly perform voice or video telephony (VT) calls. Such poor performance cannot be determined based on just throughput. Therefore, there is a need for a better mechanism to determine such performance and take corrective actions promptly.

SUMMARY

The following presents a simplified summary of one or more aspects to provide a basic understanding of such aspects. This summary is not an extensive overview of all contemplated aspects, and is intended to neither identify key or critical elements of all aspects nor delineate any aspects. Its sole purpose is to present concepts of one or more aspects in a simplified form as a prelude to the more detailed description presented later.

In an aspect, the present disclosure includes a method, an apparatus, and a computer-readable medium for wireless communications. The example method may identify, by a user equipment (UE), a first AP available for communication. The example method may determine, by the UE, whether the first AP is suitable based, at least in part, on an indication for the first AP in an AP history table stored in a memory of the UE, wherein the indication is based on UE-determined metrics determined during one or more prior communications between the UE and the first AP. The example method may also include establishing communication between the UE and the first AP, in response to determining that the first AP is suitable.

The present disclosure also includes an apparatus having components or configured to execute or means for executing the above-described methods, and a computer-readable medium storing one or more codes executable by a processor to perform the above-described methods.

To the accomplishment of the foregoing and related ends, the one or more aspects comprise the features described and particularly pointed out in the claims. This description and the annexed drawings set forth in detail certain illustrative features of the one or more aspects. These features are indicative, however, of but a few of the ways in which the principles of various aspects may be employed, and this description should include all such aspects and their equivalents.

BRIEF DESCRIPTION OF THE DRAWINGS

The disclosed aspects will be described in conjunction with the appended drawings, provided to illustrate and not to limit the disclosed aspects, wherein like designations denote like elements, and in which:

FIG. 4 is an chart illustrating factors affecting quality of service for voice calls hosted on Wi-Fi APs.

FIG. 8 is a data table illustrating an example AP history table for selecting APs according to various aspects of the present disclosure.

DETAILED DESCRIPTION

Figure 1:
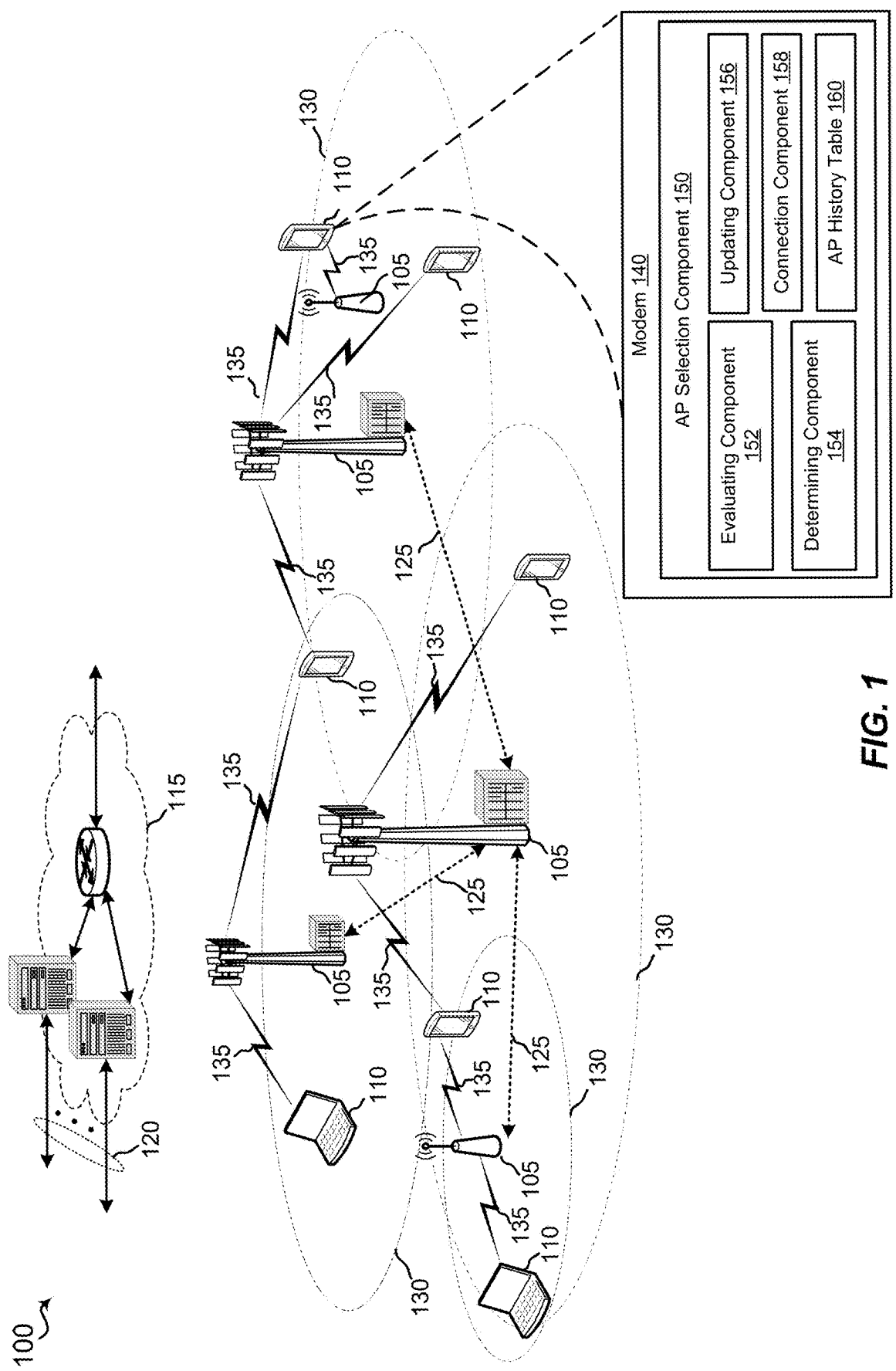
FIG. 1 is a schematic diagram of an example wireless communication network including at least one user equipment having an AP selection component configured to select an AP for providing a service at the UE according to various aspects of the present disclosure.

Various aspects are now described referring to the drawings. In this description, for explanation, numerous specific details are described to provide a thorough understanding of one or more aspects. It may be evident, however, that such aspect(s) may be practiced without these specific details. And the term "component" as used herein may be one of the parts that make up a system, may be hardware, firmware, and/or software stored on a computer-readable medium, and may be divided into other components.

The present disclosure generally relates to enabling user equipment (UE) to identify a first access point (AP) available for communication based on suitability according to UE-determined metrics determined during one or more prior communications between the UE and the first AP. The present disclosure may include determining, by the UE, whether a first AP is suitable based, at least in part, on an indication for the first AP in an AP history table stored in a memory of the UE. The present disclosure may also include establishing communication between the UE and the first AP, in response to determining that the first AP is suitable. The indication of the AP's suitability may be calculated or determined based on service metrics and modem metrics observed or analyzed by the UE during prior communications with the first AP.

The present disclosure may optionally relate to identifying, at the UE, a second AP collocated with and/or accessible by the first AP and available for communication. The present disclosure may include establishing communication between the UE and the second AP in response to the identifying of the second AP. The present disclosure may further relate to updating the AP history table to include an indication that the first AP is not suitable for communication with the UE. Thus, the present disclosure may enable the UE to decide about AP selection based on the UE's own observations of the impacts of different metrics on service quality, as opposed to being based on network-supplied commands or parameters.

Additional features of the present aspects are described in more detail below regarding FIGS. 1-21.

The techniques described may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 with a modem 140 having an AP selection component 150 that performs AP selection for providing a service at the UE. Further, wireless communication network 100 includes at least one access point (AP) 105 that supports communications on a communication channel (e.g., communications link 135) between the UE 110 and the AP 105.

In an aspect, the UE 110 may execute AP selection component 150 to select an AP 105 for providing a service at the UE 110. The UE 110 itself may evaluate metrics associated with a service, e.g., a voice or video telephony (VT) service, over a connection between the UE 110 and an AP 105 (referred to as a first AP in the present disclosure). In some aspects, the first AP 105 may belong to a first RAT (e.g., Wi-Fi, 4GLTE, 5G/NR, etc.). The UE 110 determines whether the first AP is suitable for establishing a connection with the UE 110. For example, the UE 110 may determine whether the first AP 105 is suitable for providing the service based on the evaluated metrics. The UE 110 updates an AP history table 160 which is located at the UE 110 based on whether the UE 110 determines whether the first AP is suitable for establishing communication with the UE 110.

The UE 110 may try to identify another AP 105, referred to as a second AP 105, when the UE 110 determines that the first AP 105 is not suitable for establishing communication with the UE 110. The second AP 105 may belong to the first RAT or alternatively may belong to a second RAT different from the first RAT. In either instance, the second AP 105 may be collocated with and/or accessible by the first AP 105. That is, the UE 110 is looking for collocated and/or accessible APs. In an example aspect, the first AP 105 may be a Wi-Fi AP and the second AP 105 may be a LTE AP which are collocated and/or accessible. The identifying of the alternate AP provides an option to camp on a different AP collocated and/or accessible along with the original AP in case the AP is not suitable for the service. In an aspect, when the UE 110 identifies a second AP 105, the UE 110 may camp on the second AP 105. And the UE 110, upon determining that the first AP 105 is not suitable for providing the service, may update the AP history table 160 to indicate that the UE 110 is barred from camping on the first AP 105, with certain exceptions as described below.

The UE 110, however, in some aspects, may camp on the first AP 105 when the UE 110 identifies a second AP 105 is not available (e.g., no collocated and/or accessible APs available) or certain pre-defined or pre-configured rules are satisfied. The pre-defined or pre-configured rules provides flexibility or control over the camping of the UE 110 on the first/second APs 105.

The UE 110 and/or the AP selection component 150 may include one or more additional components for selecting an AP 105 for camping or for providing a service at the UE 110. In an aspect, the UE 110 and/or the AP selection component 150 may execute an evaluating component 152 to evaluate one or more service metrics, e.g., including metrics relating to one or more protocol layer level parameters on the UE 110, associated with the service over a connection between the UE 110 and an AP 105. The evaluation component 152 may also evaluate modem metrics associated with connection quality between the UE 110 and the AP 105 while the UE 110 is camped on the AP 105. The UE 110 and/or AP selection component 150 may further execute a determining component 154 to identify nearby APs 105 available for communication with the UE 110 and to determine whether the an AP 105 is suitable for establishing a connection with the UE 110, e.g., providing the service, based on the evaluation. The UE 110 and/or the AP selection component 150 may execute an updating component 156 to update the AP history table 160 based at least on the determination. And the UE 110 and/or the AP selection component 150 may execute a connection component 158 to establish communication between the UE 110 and a selected AP 105, such as by requesting that the AP 105 host the service, or camping the UE 110 on the first AP 105 or the second AP 105.

The wireless communication network 100 may include one or more APs 105, one or more UEs 110, and a core network 115. The core network 115 may provide user authentication, access authorization, tracking, internet protocol (IP) connectivity, and other access, routing, or mobility functions. The APs 105 may interface with the core network 115 through backhaul links 120 (e.g., S1, etc.). The APs 105 may perform radio configuration and scheduling for communication with the UEs 110, or may operate under the control of a AP controller (not shown). In various examples, the APs 105 may communicate, either directly or indirectly (e.g., through core network 115), with one another over backhaul links 125 (e.g., X1, etc.), which may be wired or wireless communication links.

The APs 105 may wirelessly communicate with the UEs 110 via one or more AP antennas. Each of the APs 105 may provide communication coverage for a respective geographic coverage area 130. In some examples, APs 105 may be referred to as a base transceiver station, a radio base station, an access point, an access node, a radio transceiver, a NodeB, eNodeB (eNB), gNodeB (gNB), Home NodeB, a Home eNodeB, a relay, or some other suitable terminology. The geographic coverage area 130 for a AP 105 may be divided into sectors or cells making up only a portion of the coverage area (not shown). The wireless communication network 100 may include APs 105 of different types (e.g., macro APs or small cell APs, described below). Additionally, the plurality of APs 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a new radio (NR) or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB, gNB) may be generally used to describe the AP 105, while the term UE may be generally used to describe the UEs 110. The wireless communication network 100 may be a heterogeneous technology network in which different types of eNBs provide coverage for various geographical regions. For example, each eNB, gNB or AP 105 may provide communication coverage for a macro cell, a small cell, or other types of cell. The term "cell" is a 3GPP term that can be used to describe a AP, a carrier or component carrier associated with a AP, or a coverage area (e.g., sector, etc.) of a carrier or AP, depending on context.

A macro cell may generally cover a relatively large geographic area (e.g., several kilometers in radius) and may allow unrestricted access by the UEs 110 with service subscriptions with the network provider.

A small cell may include a relative lower transmit-powered AP, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 110 with service subscriptions with the network provider. A femto cell may also cover a small geographic area (e.g., a home) and may provide restricted access and/or unrestricted access by the UEs 110 having an association with the femto cell (e.g., in the restricted access case, the UEs 110 in a closed subscriber group (CSG) of the AP 105, which may include the UEs 110 for users in the home, and the like). A micro cell may cover a geographic area larger than a pico cell and a femto cell, but smaller than a macro cell. An eNB, gNB for a macro cell may be referred to as a macro eNB, gNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARD) to provide retransmission at the MAC layer to improve link efficiency. In the control plane, the RRC protocol layer may provide establishment, configuration, and maintenance of an RRC connection between a UE 110 and the AP 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of APs 105 and network equipment including macro eNBs, small cell eNBs, macro gNBs, small cell gNBs, relay APs, and the like.

UE 110 may be configured to establish one or more wireless communication links 135 with one or more APs 105. The wireless communication links 135 shown in wireless communication network 100 may carry uplink (UL) transmissions from a UE 110 to a AP 105, or downlink (DL) transmissions, from an AP 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). In some aspects, the wireless communication links 135 may represent one or more broadcast channels.

In some aspects of the wireless communication network 100, APs 105 or UEs 110 may include multiple antennas for employing antenna diversity schemes to improve communication quality and reliability between APs 105 and UEs 110. Additionally or alternatively, APs 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The APs 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include APs 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of APs 105 and/or UEs 110 may operate according to a NR or 5G technology referred to as millimeter wave (mmW or mmwave or MMW) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, APs 105 and/or UEs 110 operating according to the mmW technology may utilize beamforming in their transmissions to compensate for the extremely high path loss and short range.

Figure 2:
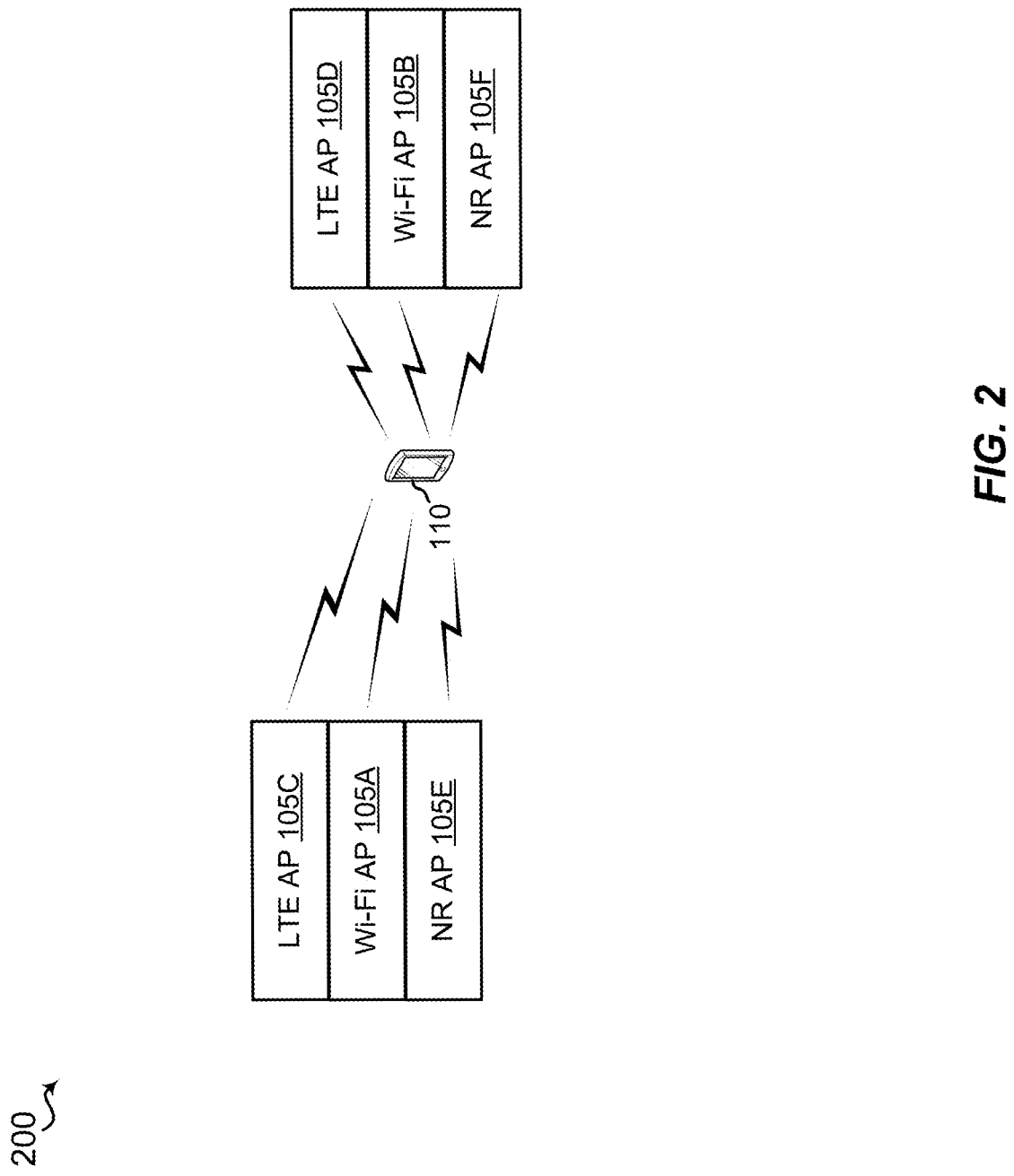
FIG. 2 is a schematic diagram of an example of a plurality of APs of a wireless communications network from which the UE selects an AP for providing a service at the UE according to various aspects of the present disclosure.

FIG. 2 illustrates an example of a wireless communication network 200 with a plurality of APs 105 from which the UE 110 selects an AP for providing a service at the UE 110. For example, wireless communications network 200 may include one or more Wi-Fi APs, e.g., Wi-Fi APs 105A and 105B, LTE APs, e.g., LTE APs 105C and 105D, and/or NR APs, e.g., 105E and 105F. Although FIG. 2 shows two APs for each of the RATs, the disclosure is not limited to two APs each. FIG. 2 is for illustration/description purposes only.

In an aspect, during a multimedia session, e.g., a voice or VT call at the UE 110, the UE 110 may be camped on an AP, e.g., Wi-Fi AP 105A and may start evaluating a connection, e.g., Wi-Fi connection or link between the UE 110 and the Wi-Fi AP 105A.

The UE 110 may determine that the connection is not suitable for the service, e.g., based on a binary indication and/or based on an algorithm which determines whether the current network conditions are suitable for a satisfactory level of service, and which may vary based on the service. The UE 110 may then try to identify another AP belonging to the same or a different RAT depending on a pre-defined or pre-configured priority based on an algorithm for system selection when the history information is not yet available. In an aspect, the APs 105A and 105C may be collocated and/or accessible APs. In additional aspects, the APs 105A, 105C, and/or 105E may be collocated and/or accessible APs. The UE 110 updates the AP history table 160 and camps on the appropriate AP based on the evaluation/determination.

Similarly, during a multimedia call, e.g., a voice or VT call at the UE 110, the UE 110 may be camped on an AP, e.g., LTE AP 105C, and may start evaluating a connection, e.g., LTE connection or link between the UE 110 and the LTE AP 105C. If the UE 110 determines that the connection is not suitable for the service as described above, the UE 110 may try to identify another AP belonging to a same or a different RAT, e.g., AP 105E. In an aspect, the APs 105C and 105E may collocated and/or accessible APs. The AP selection component 150 and/or the updating component 156 updates the AP history table 160 and camps on the appropriate AP based on the evaluation/determination.

Figure 3:
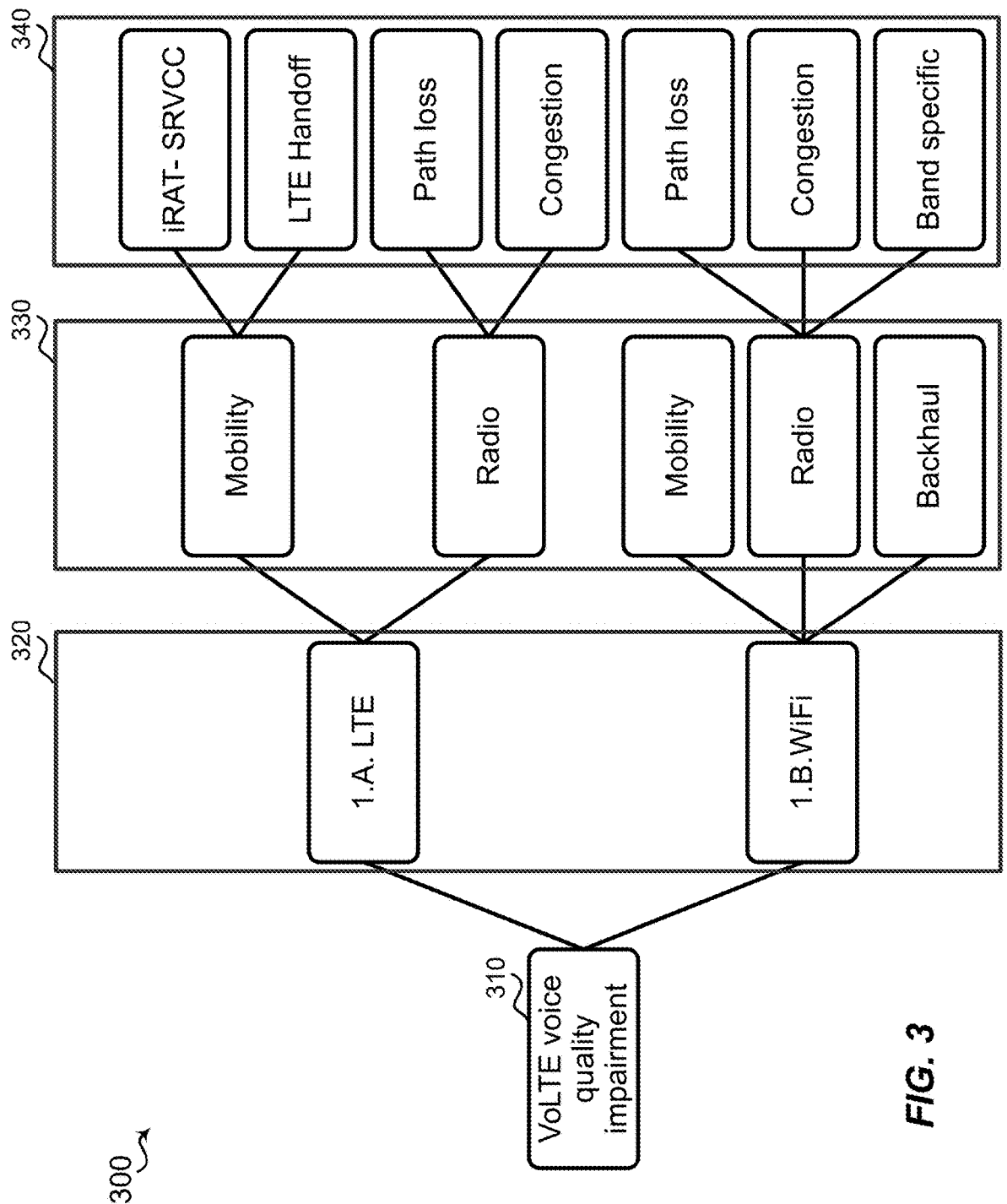
FIG. 3 is a decision tree diagram illustrating factors affecting a multimedia service session executing on an UE

Referring to FIG. 3, a decision tree 300 illustrates factors affecting a multimedia service session executing on an UE 110. The multimedia services may include voice calls and video telephony among other multimedia services. Service quality impairment 310 at the UE 110 may be affect by optimal domain selection of access technology 320, as represented by blocks 1.A, 1.B. For example, the selection of a Wi-Fi AP to host a multimedia service may provide reduced voice quality over the selection of an LTE AP.

Columns 330 and 340 include activities on the access technology that require a better call continuity or domain selection decision than the multimedia service. For example, LTE APs may provide reduced voice quality for the multimedia service if the user is mobile and experiencing handoffs to other APs within an LTE cluster. Similarly, if radio access technologies (RATs) in use by the UE 110 for other services are interfering with the multimedia service, then reduced voice quality may be experienced by the user.

LTE system selection for multimedia services like VoLTE or Video telephony is performed based on system camping algorithms that rely on signal strength, broadcasted system information, and other network side metrics. These algorithms may bar the UE 110 from selecting the LTE network when the network explicitly informs the UE about barring or congestion. However, as VoLTE is sensitive to jitter, voice quality can be affected well before the network load reaches a level that meets a network congestion threshold. AP selection policies that rely entirely on network-determined metrics cannot ensure adequate voice or video quality in VoLTE calls.

Further, VoLTE quality may be affected because of user mobility, intra LTE handoff, SRVCC, handoff to VoWiFi, variations in radio conditions or network load that add delay variation (i.e. jitter or packet loss). A typical throughput indicator may not work as it does not factor the latency and jitter.

Voice quality during multimedia services may be improved if the UE 110 "learns" the network characteristic of APs (e.g., eNB or gNB, Wi-Fi Access Points) of the LTE or Wi-Fi "cluster" and applies the learned information to future AP selection to avoid habitually congested APs. Pattern recognition based on UE 110 determined metrics may reduce latency and jitter, because the metrics account for negative impacts experienced by the UE 110 itself rather than network metrics.

Referring to FIG. 4, a chart 400 illustrates factors affecting quality of service for voice calls hosted on Wi-Fi APs. Multimedia services such as voice over Wi-Fi (VoWiFi) and video telephony may be negatively affected by several factors.

Because larger data throughput may be available to UEs 110 over Wi-Fi, a UE 110 may attempt to handoff to a Wi-Fi AP rather than hosting a multimedia service on an LTE AP. But, hosting multimedia services on a Wi-Fi AP may be negatively affected by several factors. Voice over Wi-Fi limitations 410 may include: potential for overcrowding on the 2.4 GHz band 420; a low footprint in the 5 GHz band 430; Fragmented and unreliable nature of Publicly available Wi-Fi APs 430; and backhaul communications and density presented by private Wi-Fi APs 440. VoWiFi implementations may sacrifice voice quality to maintain a small footprint in an available channel.

Based on the present disclosure, voice quality in multimedia services hosted on Wi-Fi APs may be improved by enabling the UE 110 to learn AP channel quality during camping, and service quality during actively hosted services. By using the obtained metrics to classify Wi-Fi APs as good, neutral, or bad, the UE 110 may reduce the time that it spends on bad APs and as such may reduce jitter and latency, improving voice quality in multimedia services.

Figure 5:
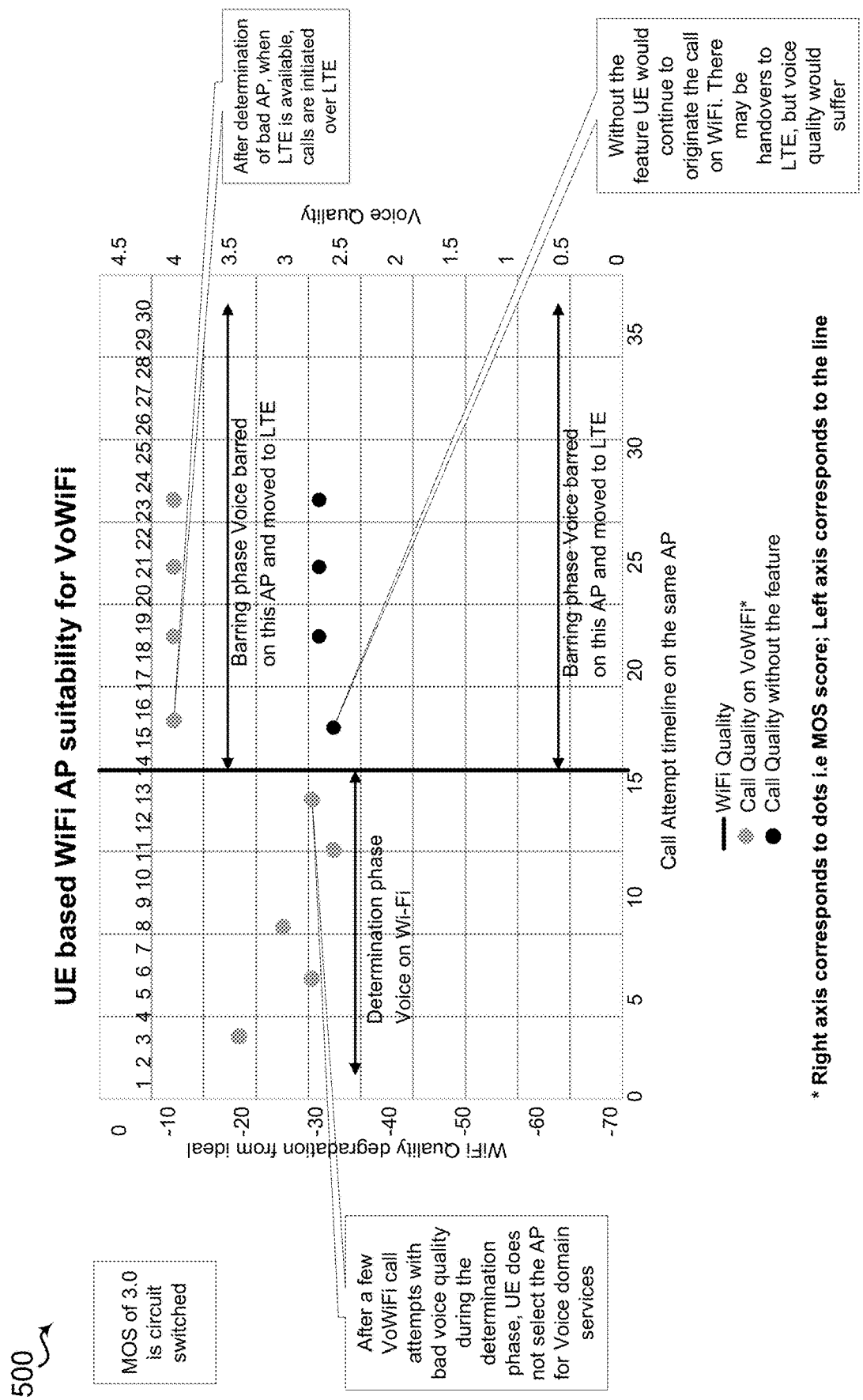
FIG. 5 is a graph illustrating improvement in quality of service resulting from removal of APs unsuitable for hosting a service.

Referring to FIG. 5, a graph 500 illustrates classification of Wi-Fi APs according to provided voice quality based on aspects of the present disclosure. For each attempt to host a service (e.g., a voice call) on a Wi-Fi AP, the UE 110 may determine how far from ideal is the voice quality experienced by the UE 110. The UE 110 may calculate one or more scores (e.g., Mean Opinion Score (MOS) scores) and may bar access to APs with scores lying outside of an acceptable range.

For example, after a few call attempts in which the experienced voice quality is lower than a threshold, the UE 110 may update an entry in an AP history table 160 to indicate that the AP 105 is barred. The UE 110 may handoff to another Wi-Fi AP, LTE AP, or simply end the session. The next time that an attempt is made to select an AP to host the call, the UE 110 may review the history of the AP 105 and determine that the AP 105 is barred, and that no calls should be hosted by that AP 105. Without such adaptive learning techniques, the UE 110 might continue to originate calls on bad APs, prolonging poor voice quality during multimedia services and degrading the user.

In various aspects, a UE 110 may improve experienced service quality during multimedia services by learning the service characteristics of different Wi-Fi APs, and APs within an LTE cluster. The UE 110 may use the learned characteristics to select reliable uncongested APs to host services and for camping.

The learning, or training, process may include the UE 110 monitoring service metrics, application layer metrics of an executing service such as packet loss, jitter, one way delay, inter arrival delay, delay, round trip delay, buffer depths and modem metrics such as signal strengths, signal to interference ratios, channel load, retransmission attempts, collisions, access load, channel occupancy, AP supported QoS, AP supported mobility features etc., UE-determined channel quality characteristics during camping on the AP 105. If an UE communicates with an AP for a short period (e.g., less than an observation threshold) then the UE may obtain modem metrics such as mobility or handoff related observations. A UE in communication with an AP for longer than an observation threshold may also calculate a score for the AP based on service (application layer) metrics obtained during the provision of a service. These UE-determined metrics may be used instead of network key performance indicators (KPIs) to calculate one or more scores for the AP 105. Based on the AP's scores, the AP 105 may be placed into a white list, gray list, or black list stored in a non-volatile memory of the UE 110.

For example, APs regularly or serially classified as bad based on their scores may be placed in a black list to prevent future hosting of services on or camping the UE 110 on the AP 105. In a further example, congested Wi-Fi APs at an airport may be regularly congested within the 2.4 GHz band and as such may not be reliable hosts for multimedia services. Such APs may be added to a black list after several attempts to host the multimedia service have failed or produced substandard results. The UE 110 may score each AP individually and maintain individual scores in the AP history table 160.

The UE 110 may also detect changes in AP scores, such as improved scores or declining scores. One or more gray lists may store indications for APs not always good or not always bad, or improving or declining in service quality. Improvement in AP suitability for establishing communications with the UE 110 may be determined in several ways. A timer may determine the time that an AP has spent on a black list or gray list, and the elapse of the timer may signal to a processor of the UE 110 that an indication stored in the AP history table 160 in association with the AP 105 should be promoted to a more favorable gray list or a white list. AP suitability improvement may also be determined based on changes in broadcast information received from the AP. For example, an improved level of quality of service (QoS) for an AP may improve it QoS support via broadcasting support for WMM QoS profiles or LTE eNB may indicate support for voice over packet services (VoPS). Improvement may also be determined based on a threshold level of improvement in metrics reported by the AP such as reduced network and access load or congestion, improved backhaul quality, reduced duty cycle, improved transmission schedule, i.e., better modulation or coding scheme or a better medium access control protocol. Changes in mobility may cause improved suitability of APs, for example, those APs lying within an user's regular traveling path may be barred due to a high level of user mobility and frequent handoff. However if the user is stationary for a period of time, the AP may be moved, at least temporarily to a more favorable gray list or whitelist. External overrides from users or third party devices/applications tethered to the UE 110 may update an indication of an AP's suitability for communication with the UE 110. Such dynamic reclassification of APs based on UE-determined metrics does not penalize Wi-Fi APs for weak received signal strength indicators (RSSI) and handoff delays. Nor do the techniques penalize eNBs for mobility of users that results in handoffs between LTE AP.

Figure 6:
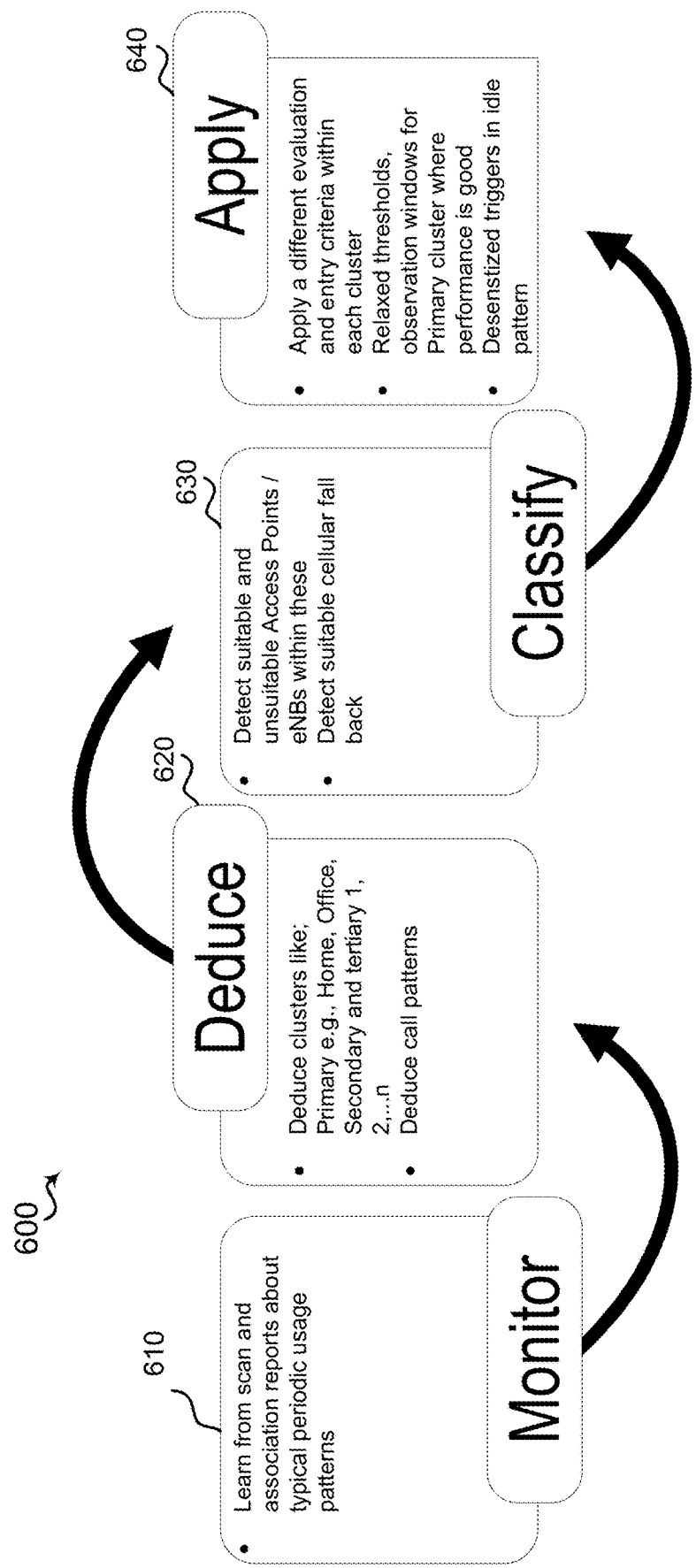
FIG. 6 is a process flow diagram of an example method for identifying suitable and/or unsuitable APs within an LTE cluster.

Referring to FIG. 6, an example method 600 executable by AP selection component 150 may enable the UE 110 to identify APs 105 within a cluster.

At block 610, the method 600 may monitor periodic usage of APs by the UE 110. For example, in an aspect, the UE 110 and/or the AP selection component 150 may include the determining component 154 or evaluation component 152, such as a specially programmed processor module, or a processor executing specially programmed code stored in a memory, to monitor communication usage patterns between the UE 110 and LTE and/or WiFi APs. The UE 110 may scan for LTE and/or Wi-Fi APs available for communication and may store information about the frequency and duration of UE connections to identified APs, which may be associated with certain geographic or user-specific locations (e.g., a primary location, such as a home, a secondary location, such as work, or a tertiary location, such as a coffee shop, etc.). The UE 110 may use the monitored information to learn periodic usage patterns of the UE 110 regarding the APs.

At block 620, the method 600 may deduce service patterns (e.g., service clusters and/or call patterns) of the UE 110. For example, in an aspect, the UE 110 and/or the AP selection component 150 may include the evaluation component 152, such as a specially programmed processor module, or a processor executing specially programmed code stored in a memory, to identify or otherwise deduce clusters of APs based, at least in apart, on the periodic usage patterns, and/or to identify or deduce call patterns. In various implementations, clusters may be associated with particular locations, such as "home," "work," "coffee shop," etc., and may be labelled as primary, secondary, tertiary, etc., according to frequency and/or duration of use, location, or call pattern.

During typical use, the UE 110 may camp on a commonly used group of eNBs for a relatively long time. For example when the user is at home, all eNBs around the home can be one cluster. When the user is at work/school, all eNBs around the work/school can be one cluster, and any eNBs lying on a user's travel path will be transitional eNBs and may not be classified as belonging to a cluster, or may be classified as belonging to a cluster but having a poor score due to frequent mobility.

At block 630, the method 600 may classify one or more APs within the cluster as suitable or unsuitable. For example, in an aspect, the UE 110 and/or the AP selection component 150 may include the evaluation component 152, such as a specially programmed processor module, or a processor executing specially programmed code stored in a memory, to analyze the AP communication patterns with the UE 110 and classify the APs as suitable or unsuitable for future communication. Several fall back APs classified as suitable may be established if future communications with other APs are unsatisfactory.

At block 640, the method 600 may apply different evaluation criteria and AP selections rules within each identified cluster, e.g., different levels of parameters for each of the different clusters may be used to identify a suitable and/or non-suitable AP). In other words, cluster-specific suitability parameters or thresholds of suitability (or unsuitability) may be determined or calculated based on one or more service metrics and modem metrics determined by the UE during prior communications sessions with the AP. For example, in an aspect, the UE 110 and/or the AP selection component 150 may include the communication component 158, such as a specially programmed processor module, or a processor executing specially programmed code stored in a memory, to apply a different evaluation and entry criteria within each cluster. In some implementations, the UE 110 may apply relaxed thresholds, observation windows for a primary cluster where performance is good as compared to a secondary and/or tertiary cluster Further based on observations made over time, UE 110, may determine that it is typically idle when located in one of the clusters. Similarly, the UE 110 may determine that it is typically idle when transitioning between two or more of the clusters, such as when the UE 110 is transitioning between a primary cluster and a secondary cluster. Based on the U 100 determining that it is idle, the mobility triggers can be desensitized to reduce mobility signaling. The use of desensitized triggers in locations or transitions in which the UE 110 is typically idle may reduce the impact that frequent handovers have on an AP's suitability indication within the AP history table 160. For example, a UE 110 moving between a primary cluster and a secondary cluster may experience frequent handovers between APs within the clusters, as the UE 110 moves in and out of range of APs along the route. Such handovers may be attributed to the movement of the UE 110 user and not the service quality of the APs themselves. Using such handover information in the evaluation of AP suitability may exaggerate the actual likelihood that a UE 110 in communication with the AP will be handed over to another AP. Thus, by providing desensitized triggers when the UE 110 is in an idle state, or an area in which the UE 110 is typically idle, the various aspects may reduce the impact of irrelevant information on the evaluation of an AP's suitability, stored within the AP history table 160.

Similar techniques may be applied to discovering and identifying clusters of LTE APs and/or Wi-Fi APs.

Figure 7:
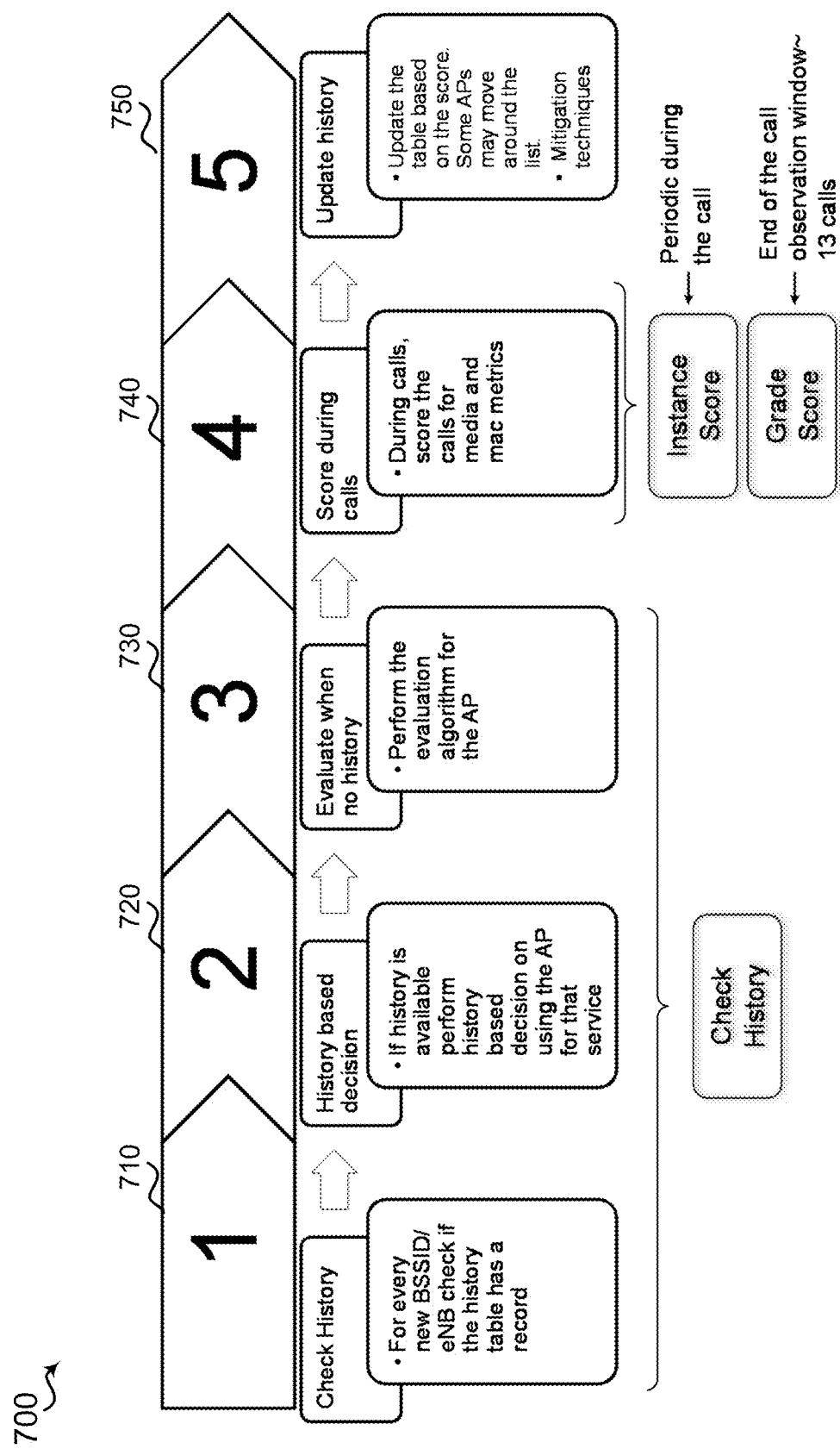
FIG. 7 is a process flow diagram illustrating a method of building an AP history table for making future AP selections according to various aspects of the present disclosure.

Referring to FIGS. 7 and 8, a method 700 of building the AP history table 160 for making future AP selections; and a corresponding example AP History table 800 (e.g., AP history table 160) are examples of the functionality of AP selection component 150. As the UE 110 establishes connections with new and known APs, the UE 110 may update the AP history table 160 stored in memory.

At block 710, the method 700 may check the AP history table 160 to determine whether an entry for the AP (e.g., AP 105) exists. For example, in an aspect, the UE 110 and/or the AP selection component 150 may include the determination component 154, such as a specially programmed processor module, or a processor executing specially programmed code stored in a memory, to determine whether it has evaluated the AP 105 for suitability hosting multimedia services. If the name or identifier of the AP 105 is in the AP history table 160, such as in the first column, then the UE 110 has encountered the AP 105 and evaluated its suitability for hosting multimedia services.

At block 720, the method 700 may use the information stored in the AP history table in association with the AP 105 to determine whether to establish communication with the AP 105. For example, in an aspect, the UE 110 and/or the AP selection component 150 may include the determination component 154, such as a specially programmed processor module, or a processor executing specially programmed code stored in a memory, to determine whether the AP 105 is suitable for establishing communication with the UE 110. In various aspects suitability may be based upon one or more scores assigned to the AP 105 or the AP's presence in a particular black list, white list, or gray list.

At block 730, the method 700 may evaluate the AP 105 to obtain service metrics and/or modem metrics in response to determining that no history for the AP 105 exists in the AP history table 160. For example, in an aspect, the UE 110 and/or the AP selection component 150 may include the evaluation component 152, such as a specially programmed processor module, or a processor executing specially programmed code stored in a memory, to monitor activity of the UE 110 while camped on the AP 105 or while the AP 105 hosts a service executing on the UE 110, e.g. a voice call or video telephony.

At block 740, method 700 may calculate one or more scores for the AP 105 based on the evaluated service metrics and/or the evaluated modem metrics. For example, in an aspect, the UE 110 and/or the AP selection component 150 may include the evaluation component 152, such as a specially programmed processor module, or a processor executing specially programmed code stored in a memory, to calculate one or more scores indicating a suitability of the AP 105 for communication with the UE 110. Instance scores may be periodically calculated during execution of a multimedia service to evaluate the service quality of an individual service. Grade scores may be calculated after an observation window has lapsed or closed. The UE 110 may set an observation window of 10 multimedia service sessions and may use collected instance scores to determine an overall grade score for the AP when hosting that multimedia's service.

At block 750, the method 700 may update entries within the AP history table 160 to include the scores of the AP 105 and/or adjust the position of other APs within lists of the table. For example, in an aspect, the UE 110 and/or the AP selection component 150 may include the updating component 156, such as a specially programmed processor module, or a processor executing specially programmed code stored in a memory, to update the entries in the AP history table 160 to include several informational elements.

For example, the AP history table 160 may contain fields storing information such as the service metrics from the last multimedia service execution hosted by the AP 105. The AP history table 160 may contain a UTC timestamp of the last multimedia service execution and the time stamp of the last time during which time-based policies were applied. Further, the AP history table 160 may include fields for identification information for collocated and/or accessible APs, which might be grouped within the same cluster as the monitored AP. Quality scores or metrics for the collocated and/or accessible APs may also be stored in the AP history table 160. The AP history table 160 may further include parameters indicating confidence (e.g., a confidence indicator) in handing over a service, such as but not limited to a multimedia service session, to the other collocated and/or accessible AP. If the stored confidence indicator is high, the service may be handed over, if not, the service may continue on the AP. The AP history table 160 also may store a mobility indicator for APs that receive low grade scores due primarily to frequent handoffs, such as those lying in a user's commuting path. In various aspects, the confidence indicator may be a value indicating the confidence in success of a potential handover.

Figure 9:
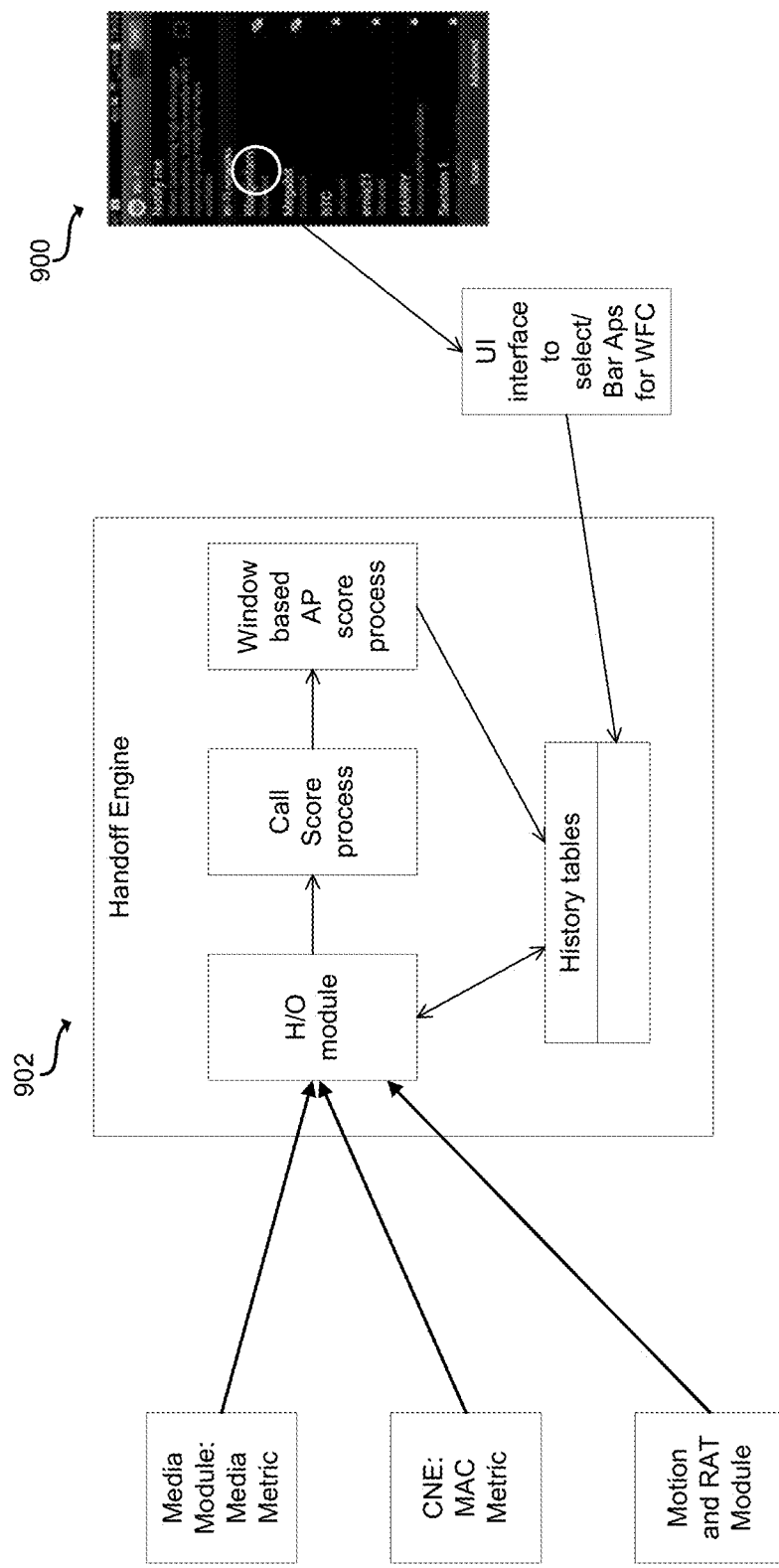
FIG. 9 is a block diagram of an example handoff engine operating in communication with a user interface and associated components and processes for controlling handoff and monitoring rules according to various aspects of the present disclosure.

Referring to FIG. 9, a user interface 900 of a UE 110 operates in communication with a handoff engine 902, and one or more associated components, for controlling the monitoring of APs and handoff rules. In various implementations, the monitored service metrics and modem metrics accumulated by the UE 110 may produce an AP score visible to the user on the use interface 900. Via the user interface 900, a user may manipulate or set up a set of rules regarding APs that should be exempted from black list status, times of day when exceptions may apply, and when to perform monitoring. The handoff engine 902, which may be a part of the handoff selection component 150, may include a handoff module that receives media metrics such as packet loss, jitter, one way delay, inter arrival delay, delay, round trip delay, buffer depths from one or more media modules, MAC protocol layer metrics and modem metrics such as signal strengths, signal to interference ratios, channel load, retransmission attempts, collisions, access load, channel occupancy, AP supported QoS, AP supported mobility features etc. from one or more Connectivity Engines, CNEs, and one or more metrics from a motion and RAT module. The handoff module and/or handoff engine 902 may initiate a call score process and a window based (e.g., UI) AP score process, and these processes may feed information into one or more AP history tables for use in making AP selection decisions.

Figure 10:
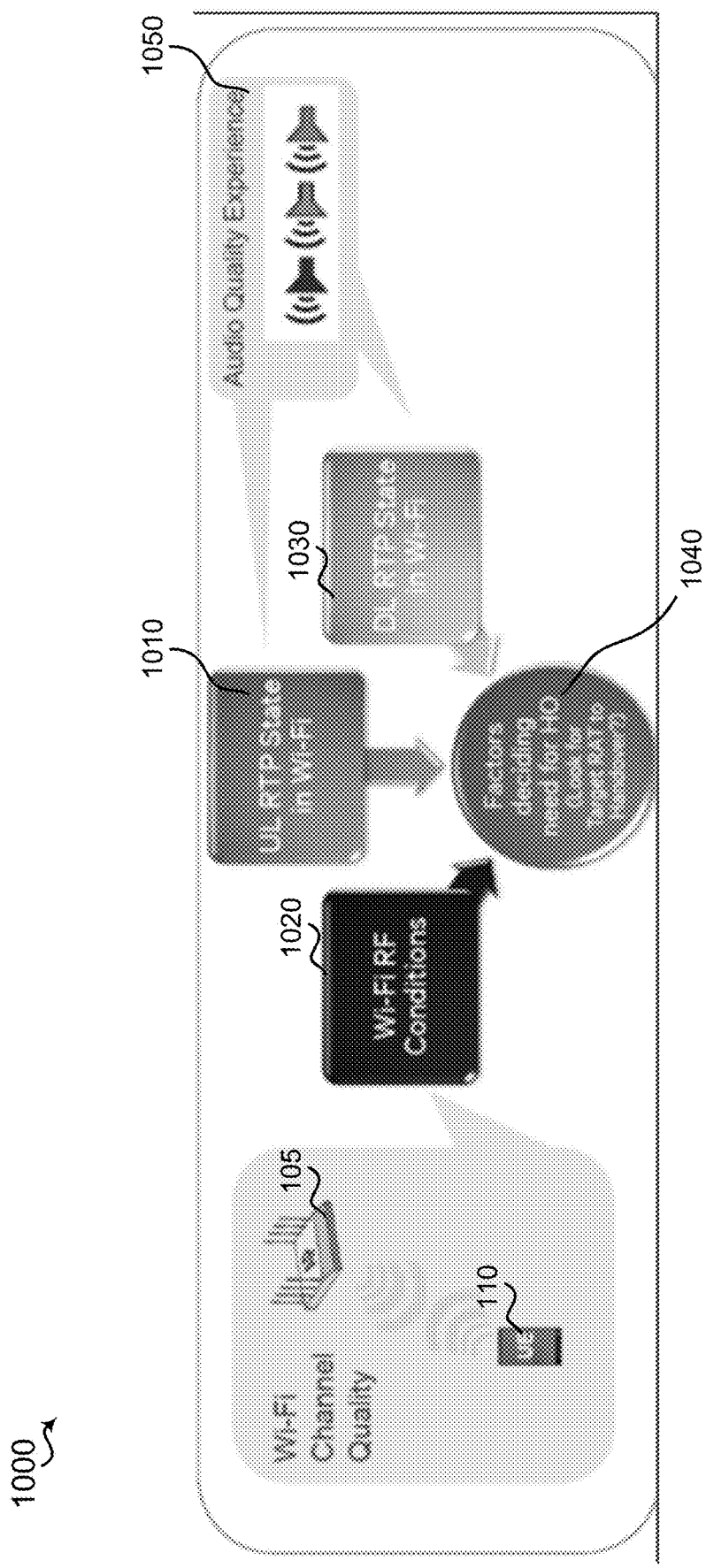
FIG. 10 is a conceptual diagram illustrating methods of using calculated AP scores to make handoff decisions for a UE according to various aspects of the present disclosure.
Figure 11:
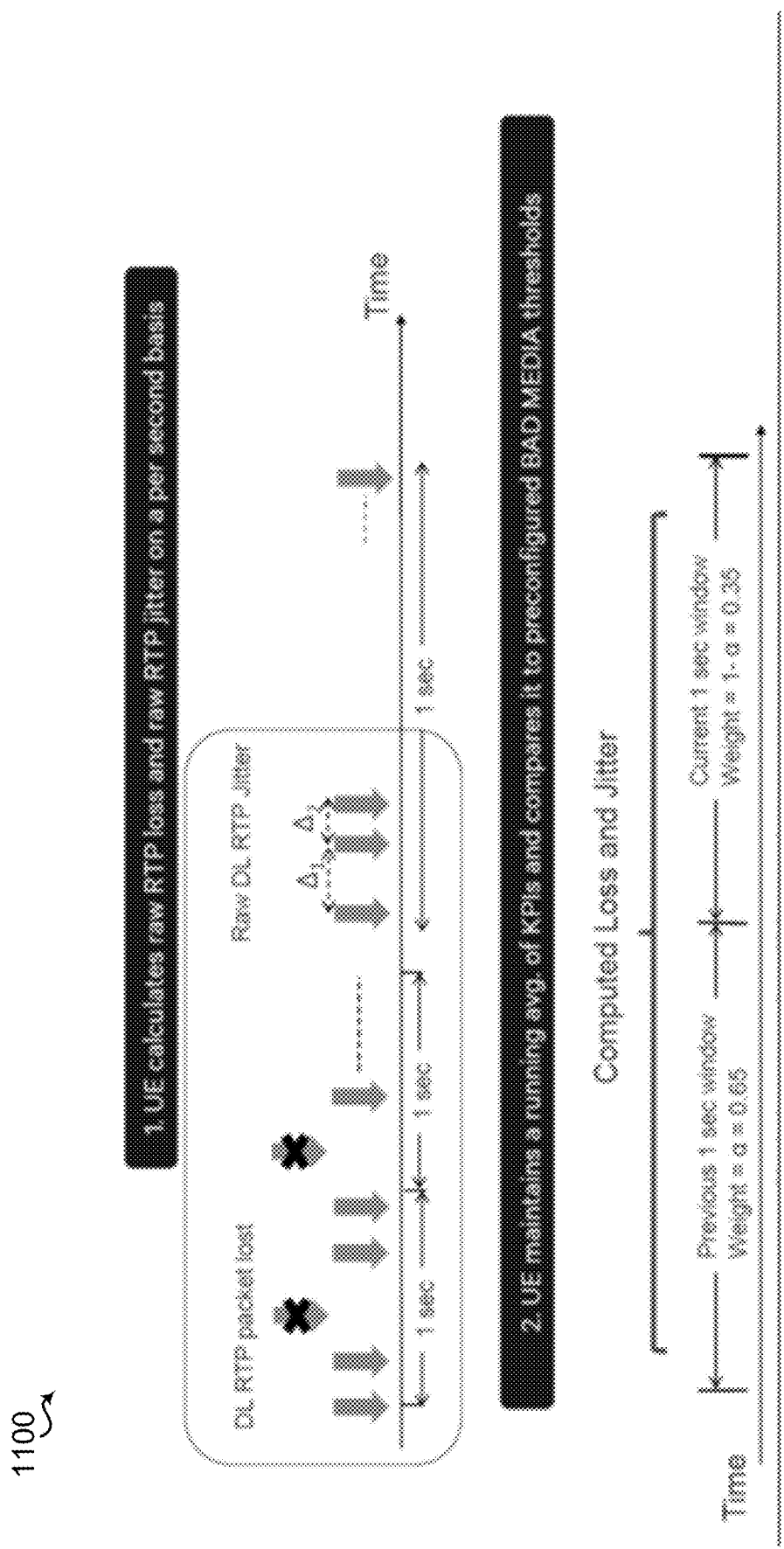
FIG. 11 is a conceptual diagram illustrating an example method of calculating downlink metrics over time in accordance with various aspects of the present disclosure.
Figure 12:
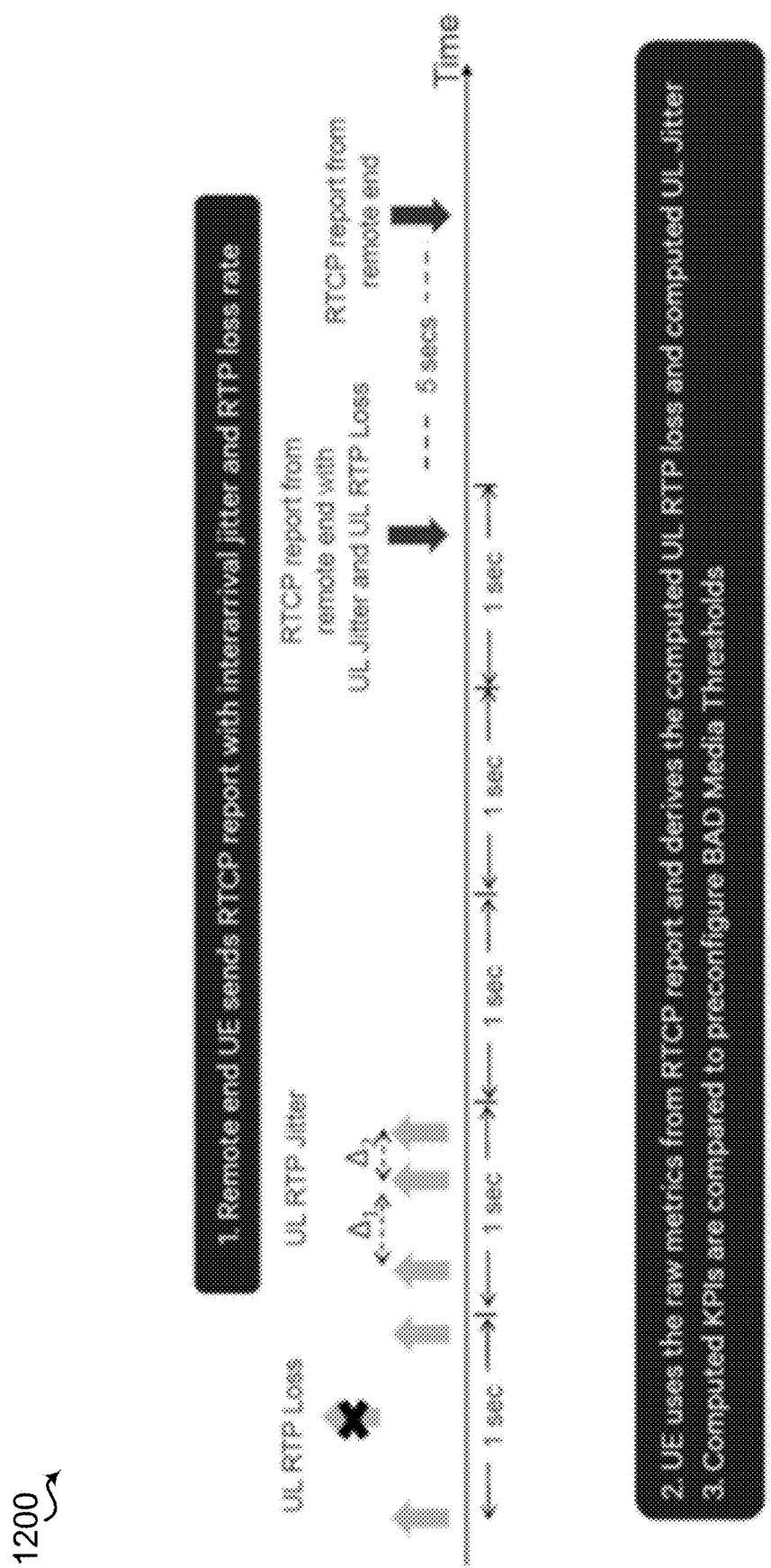
FIG. 12 is a conceptual diagram illustrating an example method for calculating uplink metrics over time according to various aspects of the present disclosure.

Referring to FIGS. 10-12, methods 1000, 1100, and 1200 executable by AP selection component 150 may use calculated AP scores to determine whether a handover to another AP would provide improved quality of service. The UE 110 may evaluate downlink data and channel quality to calculate the AP scores.

In method 1000, the UE 110 may gather channel quality data during a service session with AP 105. Channel quality data is UE-determined based on modem 140 activity, rather than network provided channel quality indicators. The collected data may be part of a Wi-Fi conditions 1020 assessment.

The UE 110 may be collecting audio quality of service data 1050 as part of a downlink (DL) real-time transfer protocol (RTP) state evaluation 1030 and/or as part of an uplink (UL) RTP state evaluation 1010. The quality of service data may be application layer data provided by components of the application layer that enable execution of the multimedia service. This data may indicate jitter, lag, and other quality degrading effects. The information may be gathered as one or more factors considered by a need for a handover evaluation 1040.

As shown in FIG. 11, the UE 110 may periodically measure the DL RTP packet loss and jitter in service output. For example, the timeline 1100 evaluates the DL RTP every second, identifying packet loss and jitter at different evaluation periods. The UE 110 may maintain a rolling list of such occurrences and may compare them against KPI thresholds. The KPI threshold may be pre-set threshold indicating "bad" AP scores or "bad" AP service metrics.

The UE 110 may also monitor UL RTP packet loss and jitter over period intervals, as shown in FIG. 12. In timeline 1200, packets transmitted by the UE 110 during a multimedia service session may be lost or subject to jitter without knowledge of the UE 110. The UE 110 may detect such service degrading effects by analyzing RTP control protocol (RTCP) reports received from the AP 105. The UE 110 may use the reports to identify whether deleterious UL conditions are resent and may compare the observed data against pre-set KPI thresholds. As with the DL RTP analysis, the UL RTP analysis may compare the raw observed data to KPI thresholds associated with "bad" AP scores or "bad" AP service metrics.

Taken in combination the quality of service data and the channel quality data may provide service metrics for the evaluation and scoring of the AP's suitability for hosting the service. These service metrics, along with uplink RTP state information, may be considered by the UE 110 when determining whether handoff to another AP would improve the quality of service experienced by a user. Specifically, the UE 110 may use these factors to determine whether handoff to another AP would reduce jitter, latency, and other deleterious effects.

Figure 13:
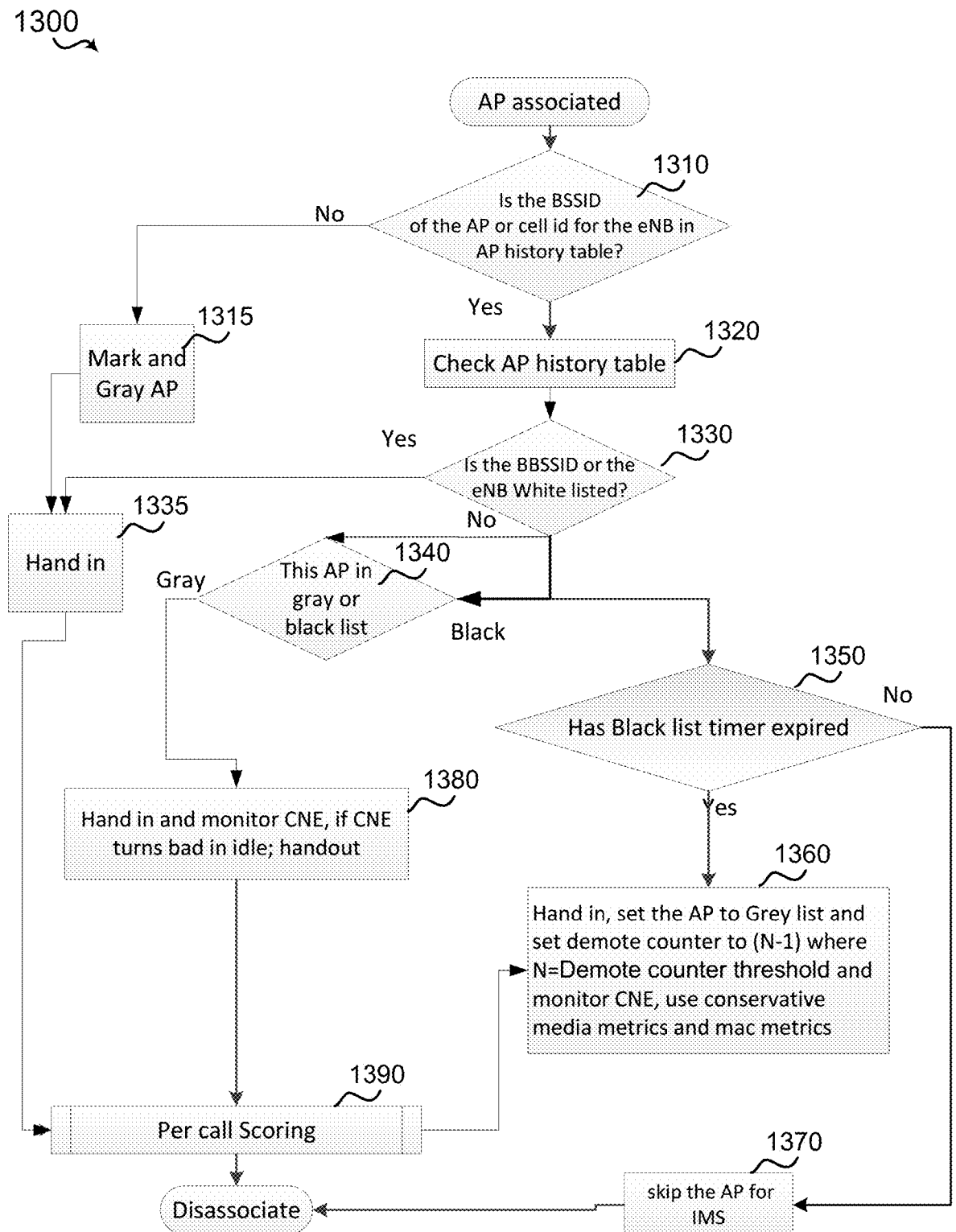
FIG. 13 is a process flow diagram illustrating an example method for using white, black, and/or gray lists stored within the AP history table to make decisions about AP handovers according to various aspects of the present disclosure.
Figure 14:
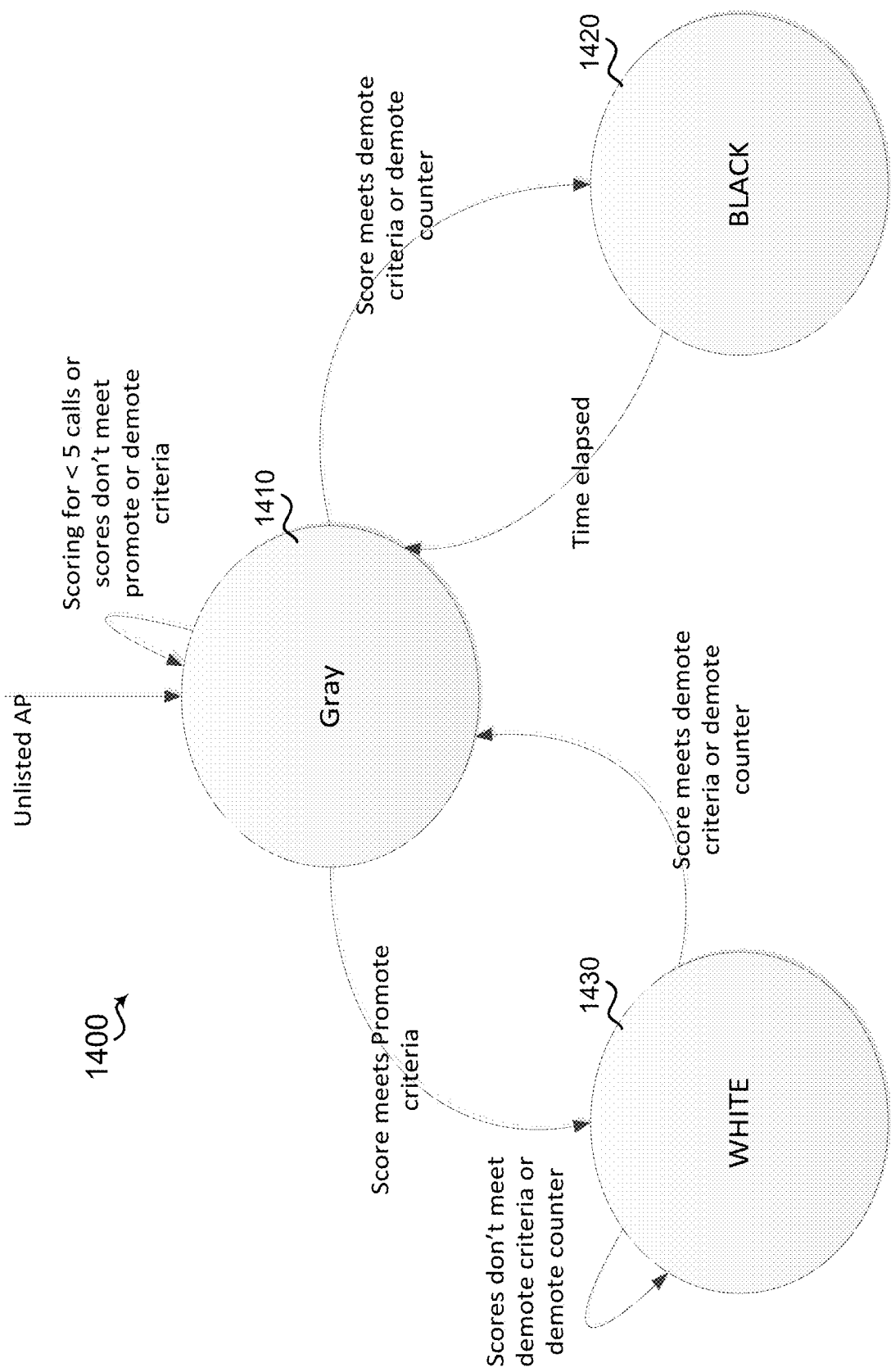
FIG. 14 is state diagram of an example list management state machine that operates to manage a list state of an AP stored in an AP history table for AP selection according to the aspects of the present disclosure.

Referring to FIGS. 13 and 14, example methods 1300, 1400 may use one or more lists stored in the AP history table 160 to decide about whether to handoff a service to AP 105. The UE 110 may perform a similar analysis for each AP in a cluster, and at each instance of a potential handover. To prepare for making the handover, the UE 110 may associate with, or otherwise identify, an available AP.

At determination block 1310, the method 1300 may determine whether an entry for the AP 105, e.g., the BSSID or MAC ID or other identifier of the AP, exists within the AP history table 160. For example, in an aspect, the UE 110 and/or the AP selection component 150 may include the determining component 154, such as a specially programmed processor module, or a processor executing specially programmed code stored in a memory, to access the AP history table 160 and search for a preexisting entry for the AP 105.

In response to determining that the AP is not within the AP history table 160 (e.g., block 1310="no"), the method 1300v may at block 1315, mark the AP 105 as a new entry and add it to a gray list 1410. The method 1300 may maintain the service on the AP 105 (e.g., hand-in) at block 1335. The method 1300 may then begin per call scoring at block 1390. The UE 110 a processor, AP selection component 150, or evaluation component 152 may evaluate the service metrics for the service executing on the UE 110. Upon completion of the service session, the UE 110 may disassociate from the AP 105.

In response to determining that the AP is within the AP history table 160 (e.g., block 1310="yes"), the method 1300 may at block 1320, check the AP history table 160 to determine which lists include the AP 105. For example, in an aspect, the UE 110 and/or the AP selection component 150 may include the determining component 154, such as a specially programmed processor module, or a processor executing specially programmed code stored in a memory, to access the AP history table 160 and search for one or more lists containing the AP 105 or an indication associated with the AP 105.

At determination block 1330, the method 1300 may determine whether the AP 105 is listed in a white list 1430. For example, in an aspect, the UE 110 and/or the AP selection component 150 may include the determining component 154, such as a specially programmed processor module, or a processor executing specially programmed code stored in a memory, to access the AP history table 160 and search the AP 105 entry within a white list 1430. If the entry is found then the AP 105 has received a score sufficient to classify it as "good" for communication with the UE 110. If the AP 105 is not within the white list 1430, then the AP may not be suitable for communication with the UE 110.

In response to determining that the AP is within a white list 1430 of the AP history table 160 (e.g., block 1330="yes"), the method 1300 may maintain hosting the service on the AP 105 (e.g., hand in) at block 1335. For example, in an aspect, the UE 110 and/or the AP selection component 150 may include the communication component 158, such as a specially programmed processor module, or a processor executing specially programmed code stored in a memory, to permit the service executing on the UE 110 to continue being hosted by the AP 105.

In response to determining that the AP is not within a white list 1430 of the AP history table 160 (e.g., block 1330="no"), the method 1300 may check the AP history table 160 to determine whether the AP 105 is listed in a gray list 1410 or a black list 1420 in block 1340. For example, in an aspect, the UE 110 and/or the AP selection component 150 may include the determination component 154, such as a specially programmed processor module, or a processor executing specially programmed code stored in a memory, to check one or more gray lists 1410 and a black list 1420 to determine the list in which the AP 105 or an indication for the AP is located.

In response to determining that the AP is within a gray list 1410 of the AP history table 160 (e.g., block 1340="gray"), the method 1300 may maintain hosting the service on the AP 105 (e.g., hand in) and monitor CNE at block 1380. For example, in an aspect, the UE 110 and/or the AP selection component 150 may include the communication component 158 and/or evaluation component 152, such as a specially programmed processor module, or a processor executing specially programmed code stored in a memory, to permit the service executing on the UE 110 to continue being hosted by the AP 105. The UE 110 may further monitor and evaluate metrics for the service hosted on the AP 105. The method 1300 may then block 1390 to monitor and evaluate service metrics on a per call basis and then disassociate form the AP 105.

In response to determining that the AP is within a black list 1420 of the AP history table 160 (e.g., block 1340="black"), the method 1300 may determine whether a black list timer has expired at block 1350. For example, in an aspect, the UE 110 and/or the AP selection component 150 may include the determination component 154, such as a specially programmed processor module, or a processor executing specially programmed code stored in a memory, to check an entry in the AP history table 150 containing a UTC timestamp of the start of a black list timer for the AP 105. If a pre-set amount of time (e.g., the timer) has passed since the UTC timestamp, then the timer has expired.

In response to determining that the black list timer for the AP 105 has expired (e.g., block 1350="yes"), the method 1300 may maintain hosting the service on the AP 105 (e.g., hand in) and move the AP 105 to a gray list 1410 at block 1360. For example, in an aspect, the UE 110 and/or the AP selection component 150 may include the communication component 158 and updating component 156, such as a specially programmed processor module, or a processor executing specially programmed code stored in a memory, to permit the service executing on the UE 110 to continue being hosted by the AP 105 and move the AP 105 or an indication for the AP 105 to a gray list 1410. Further the UE 110 may update the AP history table 160 to include a demotion counter for the AP 105 and may set the demotion counter to N−1, in which "N" is a demotion threshold. The method 1300 may then proceed to block 1390 to monitor the scores using conservative media and MAC metrics e.g., using thresholds for these metrics that are set lower than the other thresholds, to allow a black listed AP to be allowed to move of the prohibited list for the service executing on the AP 105 and may then disassociate with the AP 105 when the service is complete or based on other triggers for dissociation.

In response to determining that the black list timer for the AP 105 has not expired (e.g., block 1350="no"), the method 1300 may not host the service on the AP 105 and may move to another AP at block 1370. For example, in an aspect, the UE 110 and/or the AP selection component 150 may include the communication component 158, such as a specially programmed processor module, or a processor executing specially programmed code stored in a memory, to handoff the service to another AP and not participate in an IP multimedia subsystem (IMS) session. The UE 110 may then disassociate with the AP 105.

In these implementations, promotion and demotion counters may be associated with each AP (e.g., AP 105). Such timers may promote or demote APs from one list to another. For example, if evaluated service metrics and modem metrics of the AP result in AP scores that represent a threshold level of improvement over calculated scores, the AP may be promoted to a white list 1430 or gray list 1410. A promotion counter for the AP may be incremented with each improvement in AP scores until the threshold is reached. Demotion of APs from white list 1430 or gray list 1410 to the black list 1430 may occur by decrementation of a demotion counter based on declining AP scores.

Figure 15:
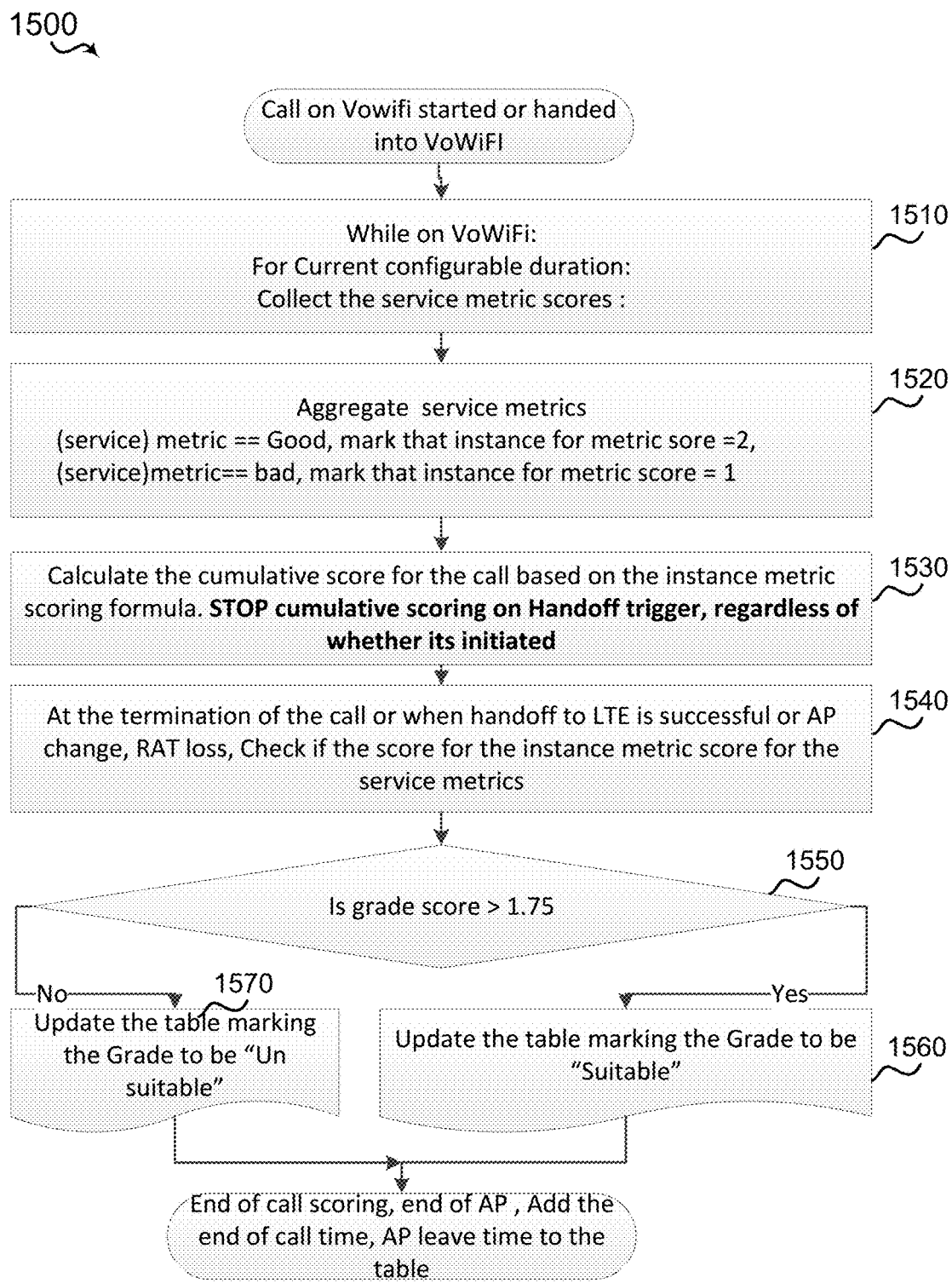
FIG. 15 is a process flow diagram illustrating an example method for calculating instance scores and grade scores during execution of a service on a UE according to various aspects of the present disclosure.
Figure 16:
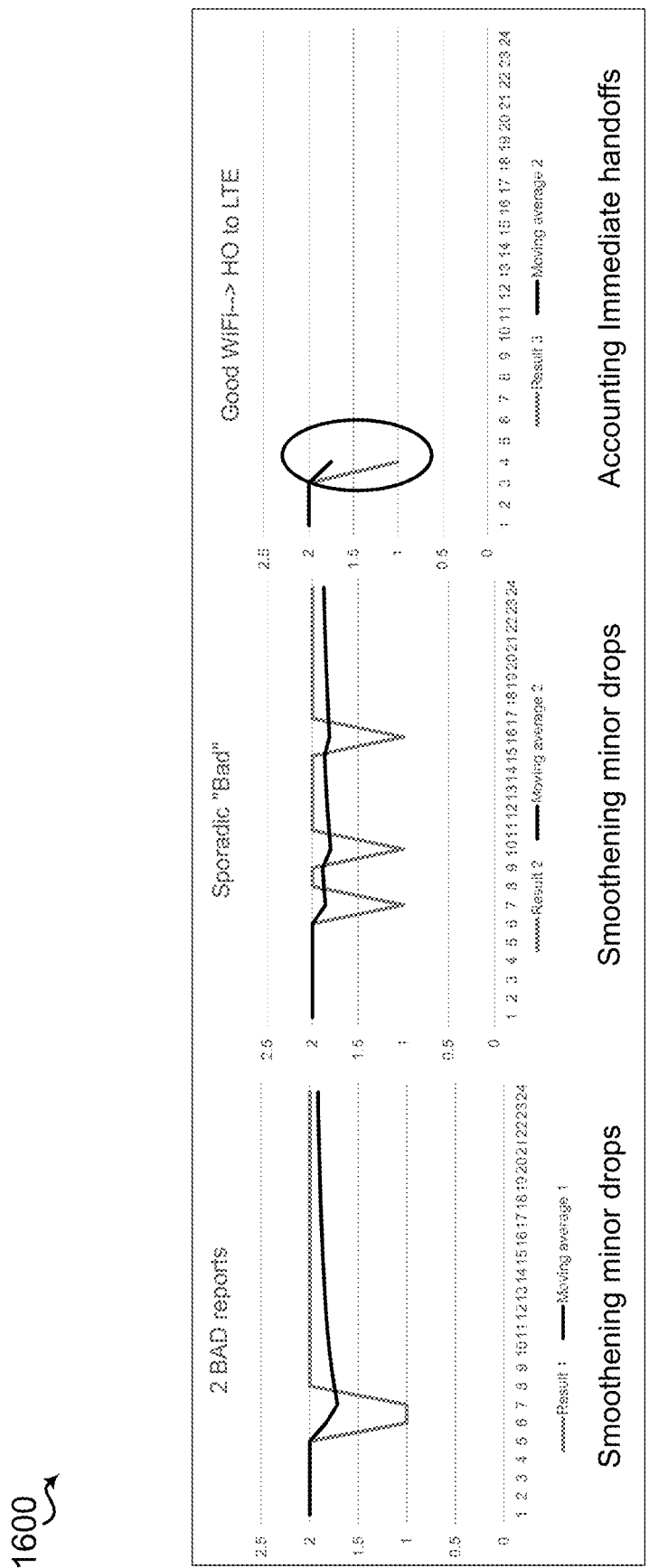
FIG. 16 is a group of graphs illustrating scores for APs classified as suitable and unsuitable for communication with a UE according to various aspects of the present disclosure.
Figure 17:
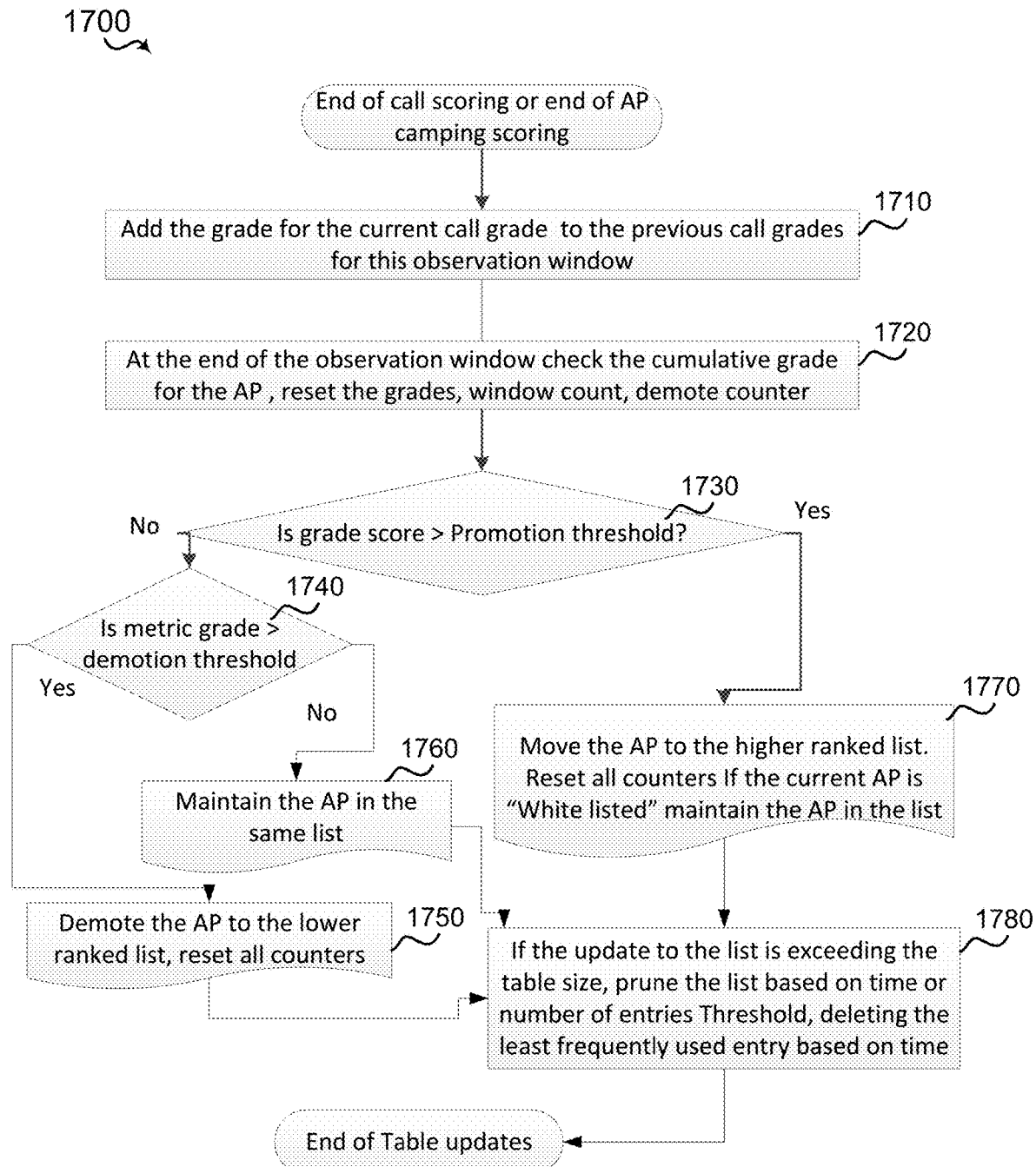
FIG. 17 is a process flow diagram illustrating an example method for implementing an AP history table updates in a UE according to various aspects of the present disclosure.
Figure 18:
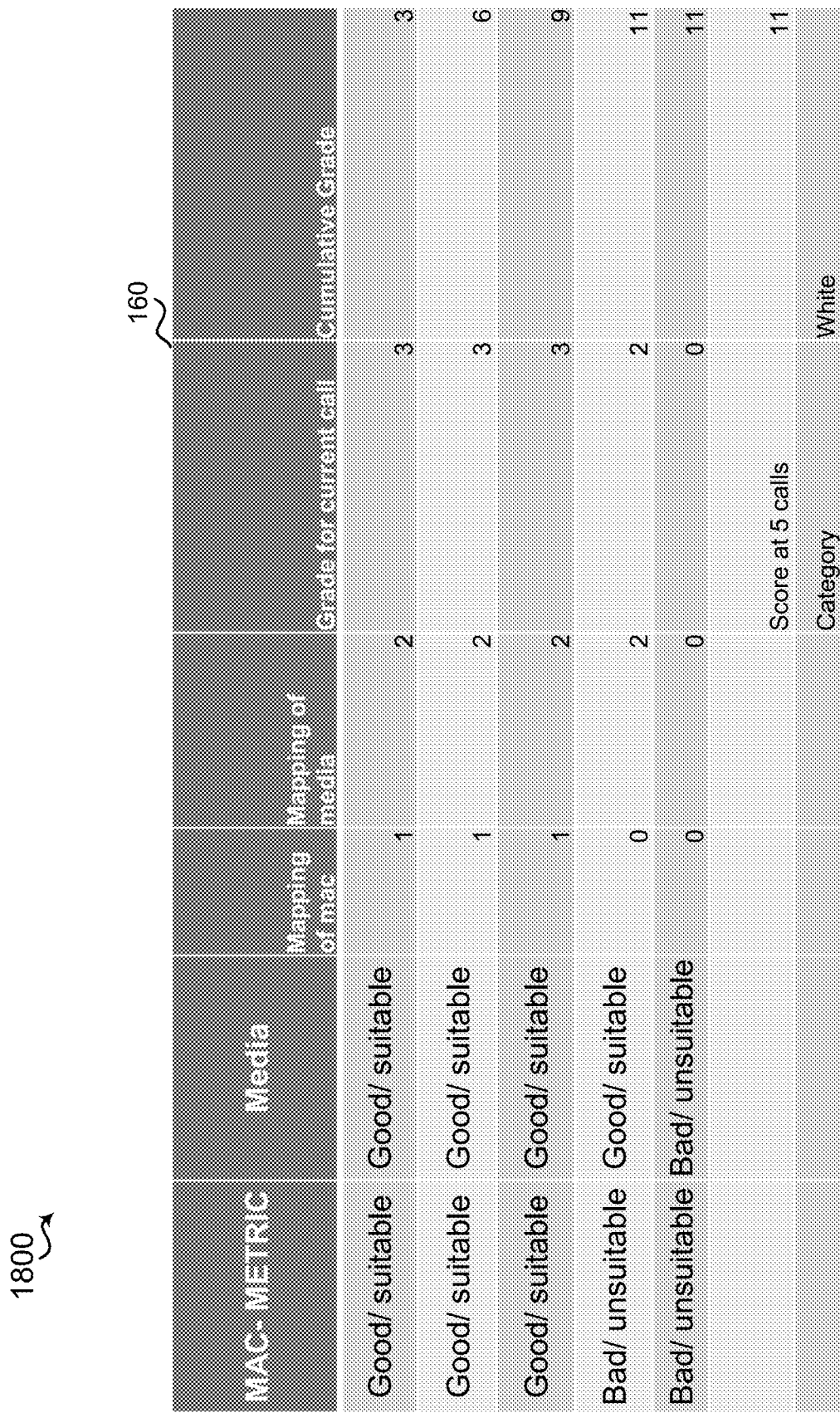
FIG. 18 is a data chart illustrating an example entry for an AP in an AP history table used for AP selection by a UE according to various aspects of the present disclosure.

Referring to FIGS. 15 and 16, an example method 1500 may calculate instance scores and grade scores during execution of a service, e.g., a VoWiFi call, on UE 110 and graphs 1600 illustrate classification of APs based on the calculated scores. In various aspects the UE 110 may use metrics (e.g., service metrics and modem metrics) calculate period scores and aggregated scores for each AP (e.g., AP 105). The UE 110 may calculate scores upon initiating a service hosted by the AP 105 or upon initiating handoff an ongoing service off to the AP 105 for hosting.

At block 1510, the method 1500 may collect service metrics for a service executing on the UE 110 for a current configurable duration while on a VoWiFi call. For example, in an aspect, the UE 110 and/or the AP selection component 150 may include the evaluating component 152, such as a specially programmed processor module, or a processor executing specially programmed code stored in a memory, to evaluate one or more service metrics associated with the service, e.g., a voice call or a video telephony (VT) call, over a connection between the UE 110 and the AP 105, during execution of the service.

At block 1520, the method 1500 may assign scores to one or more aggregated/collected service metrics to produce instance scores. For example, in an aspect, the UE 110 and/or the AP selection component 150 may include the evaluating component 152, such as a specially programmed processor module, or a processor executing specially programmed code stored in a memory, to compare one or more service metrics associated with the service, e.g., a voice call or a video telephony (VT) to metric threshold and assign a first value to service metrics that satisfy the threshold and a second value to service metrics that to not satisfy the threshold.

At block 1530, the method 1500 may collect service metrics for a service executing on the UE 110 and calculate the cumulative scores for the call based on the instance metric scoring formula. For example, in an aspect, the UE 110 and/or the AP selection component 150 may include the evaluating component 152, such as a specially programmed processor module, or a processor executing specially programmed code stored in a memory, to calculate instance scores (e.g., periodic) for the AP 105. The instance scores may be calculated according to the formula:

For n=2−m
For n=1:

Metric Score(*n*)=Metric instant value(*n*)

Where n is the service metric measurement, m is the total collected while on the AP. The granularity of measurement frequency may vary by service and/or AP type.

At block 1540, the method 1500 may combine the instance scores for the AP with the service metrics at the end of the service, e.g., at the termination of the call or handoff to LTE or AP change or RAT loss, to produce a grade score. For example, in an aspect, the UE 110 and/or the AP selection component 150 may include the determination component 154, such as a specially programmed processor module, or a processor executing specially programmed code stored in a memory, to calculate a grade score for the AP 105. The grade score may be based on all calculated instance scores and may optionally include service metrics and modem metrics. Graphs 1600 illustrate changes in grade score over time for "bad" and "good" APs.

At determination block 1550, the method 1500 may determine whether the grade score is greater than a threshold number (e.g., 1.75). For example, in an aspect, the UE 110 and/or the AP selection component 150 may include the evaluating component 152, such as a specially programmed processor module, or a processor executing specially programmed code stored in a memory, to compare the grade score to a threshold and determine whether the grade score satisfies the threshold.

In response to determining that the grade score satisfies the threshold (e.g., determination block 1550="yes"), the method 1500 may update the AP history table 160 to indicate that the AP 105 is suitable for future communications with the UE 110. For example, in an aspect, the UE 110 and/or the AP selection component 150 may include the updating component 156, such as a specially programmed processor module, or a processor executing specially programmed code stored in a memory, to update an entry in the AP history table 160 to indicate that the AP 105 is suitable for future communication (e.g., to host a multimedia service). Updating the history table may include inserting an indication in a field, or may include moving the AP or AP indication to a white list. The UE 110 may then update the AP history table 160 to include call information such as length and call timestamps.

In response to determining that the grade score does not satisfy the threshold (e.g., determination block 1550="no"), the method 1500 may update the AP history table 160 to indicate that the AP 105 is not suitable for future communications with the UE 110. For example, in an aspect, the UE 110 and/or the AP selection component 150 may include the updating component 156, such as a specially programmed processor module, or a processor executing specially programmed code stored in a memory, to update an entry in the AP history table 160 to indicate that the AP 105 is not suitable for future communication (e.g., to host a multimedia service). Updating the history table may include inserting an indication in a field, or may include moving the AP or AP indication to a black list or gray list.

The UE 110 may then end the call and record the call time stamps and duration in entries of the AP history table 160 associated with the AP 105. Again, graphs 1600 in FIG. 16 illustrate classification of APs based on the calculated scores Referring to FIGS. 17 and 18, an example method 1700 may implement AP history table 160 updates in a UE 110 and an updated table entry 1800, e.g., based on 5 calls. The UE 110 may update the AP history table 160, transitioning APs from ranked lists of suitability for hosting services. At the end of a call, the UE 110 may add up calculated grade scores and determine whether promotion or demotion of an AP is warranted based on the cumulative score.

At block 1710, the method 1700 may combine the grade scores for the AP accumulated over an observation window duration. For example, in an aspect, the UE 110 and/or the AP selection component 150 may include the evaluation component 152, such as a specially programmed processor module, or a processor executing specially programmed code stored in a memory, to calculate a cumulative grade score based on all grade scores calculated during an observation window. The observation window may be of a preset duration or may end due to a trigger such as an emergency call being placed. Table 1800 illustrates grade scores and suitability indications for APs in the AP history table 160.

At block 1720, the method 1700 may reset one or more scores, the observation window timer and any demotion counters to prepare for the next observation window. For example, in an aspect, the UE 110 and/or the AP selection component 150 may include the determination component 154, such as a specially programmed processor module, or a processor executing specially programmed code stored in a memory, to reset grade scores, observation window timer, and demotion counter to zero for the next upcoming observation window.

At determination block 1730, the method 1700 may determine whether the cumulative grade score for the AP 105 satisfies a promotion threshold. For example, in an aspect, the UE 110 and/or the AP selection component 150 may include the determination component 154, such as a specially programmed processor module, or a processor executing specially programmed code stored in a memory, to compare the cumulative grade score calculated at block 1710 to determine whether it satisfies a pre-set promotion threshold.

In response to determining that the cumulative grade score satisfies the promotion threshold (e.g., determination block 1730="yes"), the method 1700 may move the AP 105 to a higher ranked list (e.g., a white list) at block 1770. For example, in an aspect, the UE 110 and/or the AP selection component 150 may include the updating component 156, such as a specially programmed processor module, or a processor executing specially programmed code stored in a memory, to move an indication for the AP, the AP entry, or the like to a gray list or white list of higher rank than the list in which the AP is placed. For example, the AP 105 may be moved to a "better" gray list associated with APs closer to being on the white list than the gray list in which the AP 105 is located. However, if the AP 105 or an indication of the AP is already stored in the white list, then the UE 110 may disregard the promotion and reset all counters.

At block 1780, the method 1700 may remove the least used APs from the AP history table 160 if the insertion of the AP 105 onto a list exceeds the allowed table size. For example, in an aspect, the UE 110 and/or the AP selection component 150 may include the updating component 156, such as a specially programmed processor module, or a processor executing specially programmed code stored in a memory, to purge the least used entries from the AP history table 160 if the table exceeds a table size or otherwise runs low on space.

In response to determining that the cumulative grade score does not satisfy the promotion threshold (e.g., determination block 1730="no"), the method 1700 determine whether the cumulative grade score satisfies a demotion threshold (e.g., a white list) at determination block 1740. For example, in an aspect, the UE 110 and/or the AP selection component 150 may include the determining component 154, such as a specially programmed processor module, or a processor executing specially programmed code stored in a memory, to compare the cumulative grade score for the observation window to a pre-set demotion threshold.

In response to determining that the cumulative grade score satisfies the demotion threshold (e.g., determination block 1740="yes"), the method 1700 may move the AP 105 to a lower ranked list (e.g., a black list) at block 1750. For example, in an aspect, the UE 110 and/or the AP selection component 150 may include the updating component 156, such as a specially programmed processor module, or a processor executing specially programmed code stored in a memory, to move an indication for the AP, the AP entry, or the like to a gray list or black list of lower rank than the list in which the AP is placed. For example, the AP 105 may be moved to a "lesser" gray list associated with APs closer to being on the black list than the gray list in which the AP 105 is located. The method 1700 may then block 1790 as described above.

In response to determining that the cumulative grade score does not satisfy the demotion threshold (e.g., determination block 1740="not"), the method 1700 maintain the status of the AP 105 in a list assignment at block 1760. For example, in an aspect, the UE 110 and/or the AP selection component 150 may include the updating component 156, such as a specially programmed processor module, or a processor executing specially programmed code stored in a memory, to keep the AP 105 or an indication of the AP in a list in which the AP is assigned. The UE 110 may do nothing and move on with method 1700 to block 1790 as described above.

Figure 19:
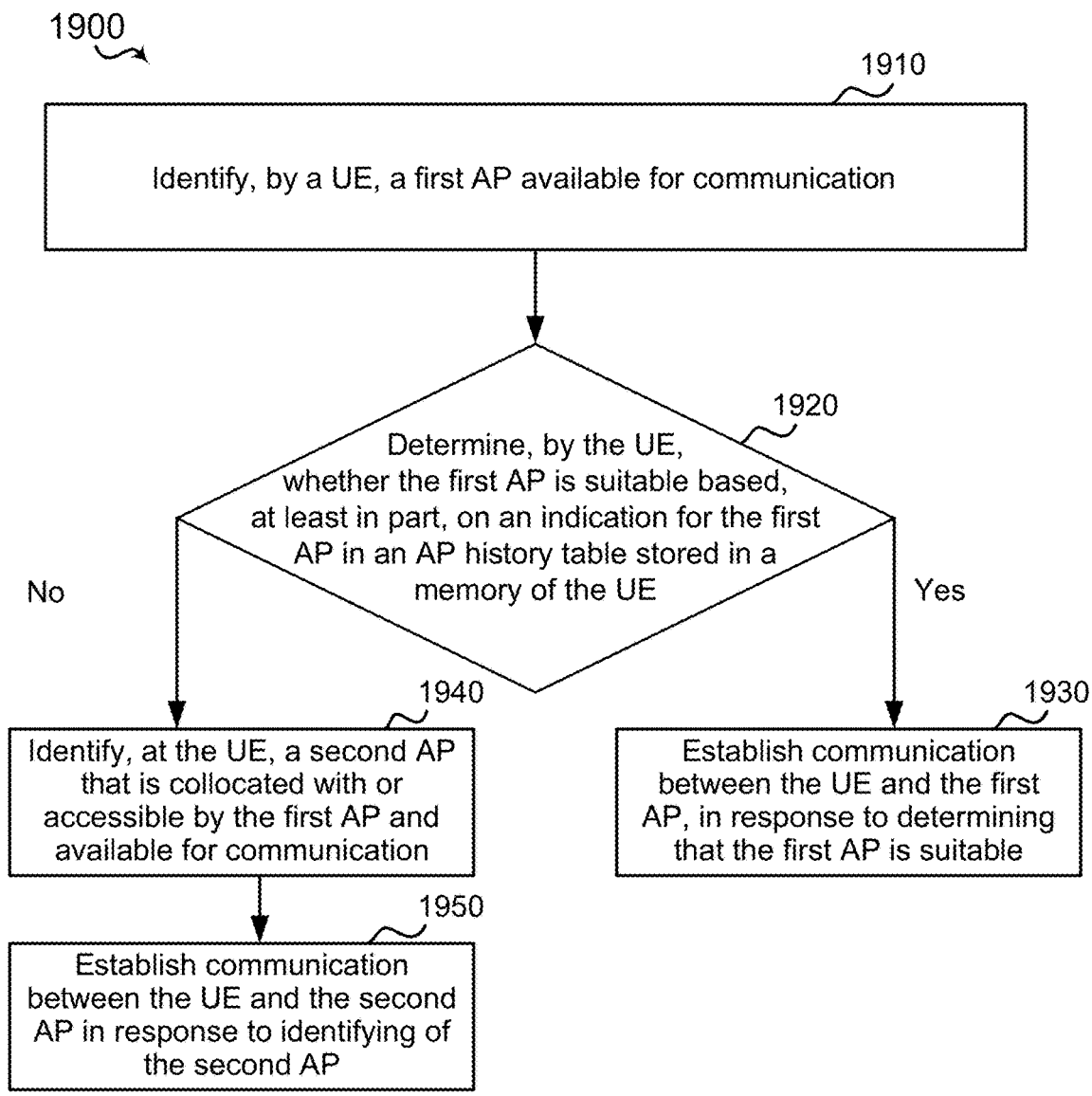
FIG. 19 is a process flow diagram illustrating an example method of establishing communication between a UE and an AP according to various aspects of the present disclosure.

Referring to FIG. 19, for example, a method 1900 of wireless communications in operating UE 110 according to the above-described aspects establish communication between the UE and an AP (e.g., AP 105) in a wireless communication system includes one or more of the herein-defined actions, with the dashed blocks being optional.

At block 1910, the method 1900 may identify a first AP available for communication. For example, in an aspect, the UE 110 and/or the AP selection component 150 may include the determining component 154, such as a specially programmed processor module, or a processor executing specially programmed code stored in a memory, to identify or otherwise detect a first AP 105 available for communicating with the UE 110.

For example, during a start-up sequence, after being powered on, the UE 110 may search for nearby APs available for communication. The UE 110 may search for Wi-Fi stations, eNB, and or gNB for connection. In some aspects, the UE 110 may identify a first AP available for communication in response to receiving a request to initiate a service rather than as part of a start-up sequence. The request may be received via an application layer interface (API) call resulting from a user interaction with the UE 110, or may be initiated by one or more applications running on the UE 110, with no direct user interaction.

At determination block 1920, the method 1900 may determine whether the first AP is suitable based on an indication for the first AP in an AP history table stored in a memory of the UE, wherein the indication is based on UE-determined metrics from prior communications with the first AP. For example, in an aspect, the UE 110 and/or the AP selection component 150 may include the determining component 154, such as a specially programmed processor module, or a processor executing specially programmed code stored in a memory, to determine, at the UE, whether the first AP is suitable (e.g., acceptable, etc.) for establishing communication with the UE 110 such as providing the service (e.g., voice or VT call) based on an indication stored in the AP history table. The indication stored in the AP history table may be determined or calculated based on one or more service metrics and modem metrics determined by the UE during prior communications sessions with the AP. The gathering of service metrics and modem metrics, and the calculation of scores for generating the indication stored in the AP history table is described throughout this disclosure.

In one example aspect, the UE 110 may determine whether the first AP is not suitable for providing the service, e.g., based on an algorithm which determines whether the network conditions are suitable for a satisfactory level of service, and which may vary based on the service, as described above. The AP 105 may not provide an acceptable level of quality of service for the voice call or the VT call at the UE 110. In another example aspect, the UE 110 may determine that the first AP is suitable for providing the service when the service provided by the first AP is at or above the threshold or the metrics at or above the threshold value. The AP 105 can provide an acceptable level of quality of service for the voice call or the VT call at the UE 110.

In an aspect, for example, the first AP may be a Wi-Fi AP, e.g., Wi-Fi AP 105A or Wi-Fi AP 105B; LTE AP, e.g., LTE AP 105C or LTE AP 105D; or NR AP, e.g., NR AP 105E or NR AP 105F. The UE 110 may determine whether the first AP is suitable for establishing communication, such as by camping the UE on the AP or hosting the service based on evaluating the indication. The indication may be stored in a white list, a gray list or a black list, each list. Indicators stored in the white list are deemed suitable for connection; indicators stored in the black list are deemed unsuitable for connection; and indicators stored in one or more gray lists are associated with APs sometimes suitable and other times unsuitable. In some aspects the gray lists may be associated with varying times of day indicators stored in a time-specific gray list may be acceptable but unacceptable during other time frames of the day. The UE 110 may evaluate or search these lists to determine whether the first AP is suitable for providing the service to the UE 110.

In response to determining that the first AP is suitable (e.g., determination block 1920="Yes"), the method 1900 may establish communication between the UE and the first AP at block 1930. For example, in an aspect, the UE 110 and/or the AP selection component 150 may include the communication component 158, such as a specially programmed processor module, or a processor executing specially programmed code stored in a memory, to establish a communication link between the UE 110 and the first AP (e.g., AP 105).

For example, the UE 110 may determine that that the first AP is suitable to host a service, such as a voice or video telephony (VT) call. The UE 110 may transmit a request to the AP to begin the service and may begin transmission of service related data in response to acceptance of the hosting request by the first AP. In some aspects, if the first AP is identified in block 1910 in response to receiving a request to initiate the service, then establishing communication in block 1930 may be the later establishment of the service.

In another example, the UE 110 may establish communication between the UE and the first AP by camping the UE 110 on the first AP. When the first AP is not immediately needed by the UE 110, the UE 110 may establish the communication link and maintain an idle ('camped") state. In some aspects, when the UE 110 identifies the first AP in block 1910 as part of a start-up sequence, the UE 110 may camp on the first UE rather than performing active communications.

In response to determining that the first AP is not suitable (e.g., determination block 1920="No"), the method 1900 may identify a second AP collocated with and/or accessible by the first AP and available for communication at block 1940. For example, in an aspect, the UE 110 and/or the AP selection component 150 may include the determining component 154, such as a specially programmed processor module, or a processor executing specially programmed code stored in a memory, to identify or otherwise detect, such as by sweeping within the same area as the first AP, a second AP 105 is collocated with and/or accessible by the first AP and available for communicating with the UE 110. The operations in block 1940 may be carried out in substantially the same manner as those performed in block 1910 as discussed above.

In some aspects, the RAT of the second AP may differ from the RAT of the first AP. The first RAT may belong to LTE, while the second RAT may belong to Wi-Fi. The second AP belongs to a RAT different from the RAT of the first AP. The UE 110 identifies (or tries to identify) the second AP when the UE 100 determines that the first AP is not suitable for providing the service to the UE 110. Both the first AP and the second AP may belong to Wi-Fi or LTE, etc.

For example, in some aspects, a Wi-Fi AP, LTE AP, and/or NR AP may be collocated and/or accessible, and the first AP may be a Wi-Fi AP/LTE AP/NR AP and/or the second AP may be a LTE AP/NR AP/Wi-Fi AP. The UE 110 may identify the second AP, e.g., initiate the procedure associated with identifying the second AP, when the UE 110 determines that the first AP is not suitable for establishing communication with the UE 110 over the connection 135 between the UE 110 and the first AP. The UE 110 may determine that the first AP is not suitable for establishing communication with the UE 110 based on the UE-determined metrics, e.g., QoS that could be provided by the first AP is below the threshold or the metrics below the threshold value. The AP 105 cannot provide an acceptable level of quality of service for the voice call or the VT call.

In block 1950, the method 1900 may establish communication between the UE and the second AP in response to identifying of the second AP. For example, in an aspect, the UE 110 and/or the AP selection component 150 may include the communication component 158, such as a specially programmed processor module, or a processor executing specially programmed code stored in a memory, to establish a communication link between the UE 110 and the first AP (e.g., AP 105). In some aspects, the second AP may already have history in the AP history table 160 and history based barring or selection may be applied based on the indication for the second AP stored in the AP history table 160.

In various aspects, if no second AP is identified as collocated and/or accessible with the first AP and available for communication with the UE 110 or if a pre-defined and/or preconfigured rule is met (e.g., an emergency call is placed or the UE 110 is roaming during a call), then the UE 110 may establish or maintain communications with the first AP. For example, when there a collocated and/or accessible AP is not available (or identified), the UE 110 may establish or maintain communication on the first AP even if the AP is not suitable for communications with the UE 110. This ensures that the UE 110 is provided with service (e.g., may be below the expected quality or QoS level) instead of dropping or terminating the call. In some other aspects, the UE 110 may establish or maintain communication with the UE 110 based on pre-provisioned or pre-defined rules, for example, for emergency calls (e.g., E911) or roaming calls. The UE 110 may camp on the first AP even if the first AP is not suitable for the service if the call is an emergency call or if the UE 110 would roam to another network if the UE 110 tries camps on the second AP. The pre-defined and/or pre-configured rules may be defined by a network operator (e.g., for E911 calls) and/or a user of the UE 110 (e.g., for roaming calls).

In some aspects, if the attempt to establish a connection with the first AP is unsuccessful in block 1930, the processor may updating the AP history table to include an indication that the first AP is not suitable for communication with the UE. For example, For example, in an aspect, the UE 110 and/or the AP selection component 150 may include the updating component 156, such as a specially programmed processor module, or a processor executing specially programmed code stored in a memory, to update an entry or indication associated with the first AP in the AP history table.

For example, the UE 110 may update a calculated score stored within fields of the AP history table. If the updated score is below a threshold, the UE may be moved to a gray list or a black list. APs suffering from reduction in calculated score may be transitioned to a list associated with less suitable (e.g., gray listed) or unsuitable (e.g., black listed) APs. Conversely, if the updated score exceeds a threshold or represents an improvement over a prior score, then the AP may be moved to a higher ranked gray list or white list. In this manner, updating the AP history table may cause the transition of AP indications across lists of the AP history table making AP selection a dynamic assessment.

Once communication with either the first AP or the second AP, method 1900 may transition over and/or include method 2000 (FIG. 20) for measuring various parameters and updating AP history table based on the communications with the first AP or the second AP.

Figure 20:
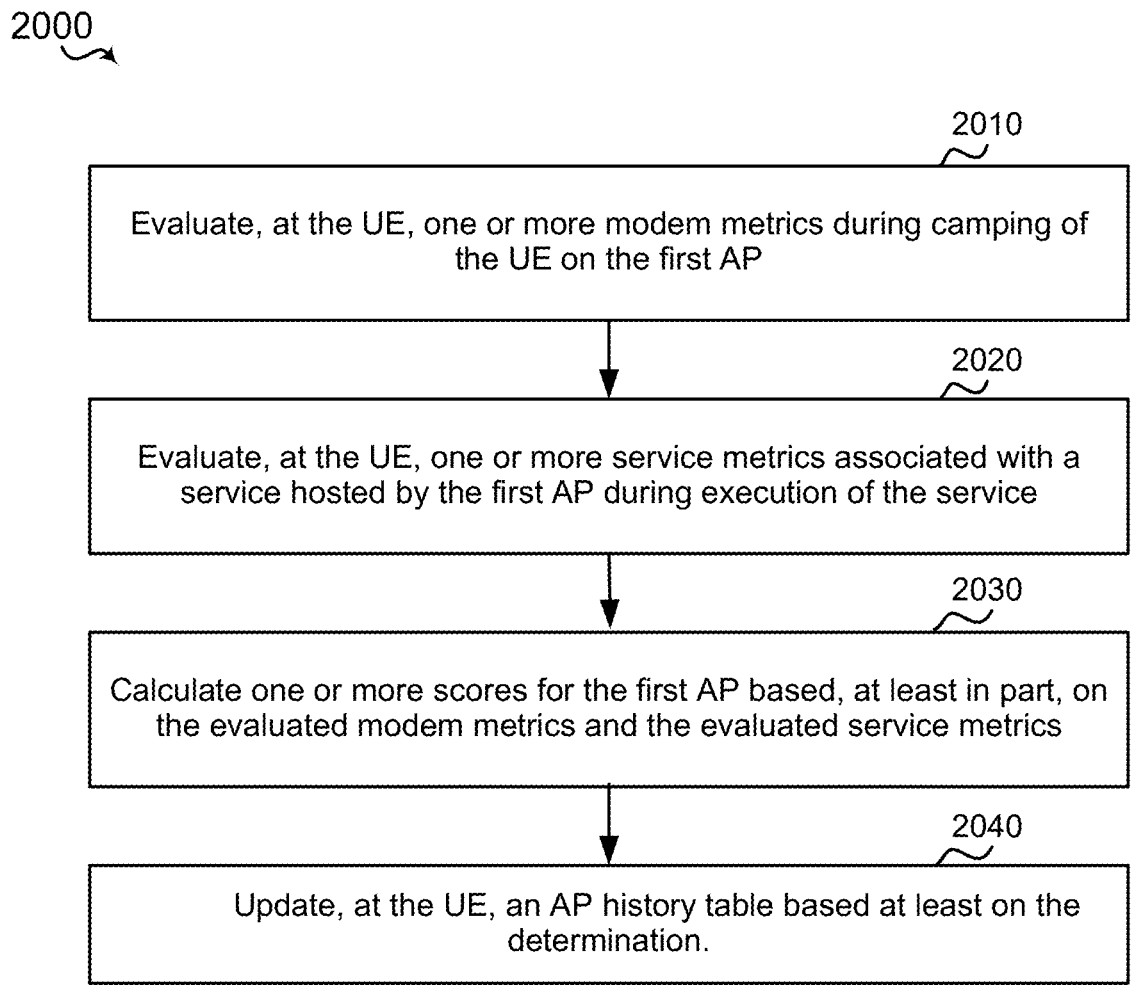
FIG. 20 is a process flow diagram of an example method for building an AP history table for AP selection according to the various aspects of the present disclosure.

Referring to FIG. 20, for example, a method 2000 of wireless communications in operating UE 110 according to the above-described aspects to populate and update an AP history table for the selection of an AP for providing a service at the UE in a wireless communication system includes one or more of the herein-defined actions, with the dashed blocks being optional. For instance, method 2000 may be performed at the end of method 1900 on either the first AP or the second AP.

At block 2010, the method 2000 may evaluate one or more modem metrics during camping of the UE on the first AP. For example, in an aspect, the UE 110 and/or the AP selection component 150 may include the evaluating component 152, such as a specially programmed processor module, or a processor executing specially programmed code stored in a memory, to evaluate one or more modem metrics associated with the quality of connection between the UE 110 and the AP 105 while the UE 110 is camped on the AP 105.

The AP 105 may be a Wi-Fi, 4G/LTE, or a 5G/NR AP. In some aspects, for example, for the connection between the UE 110 and a LTE AP, the physical layer metrics, e.g., modem metrics, that may be evaluated at the UE 110 may include one or more of a signal strength, a modulation and coding scheme (MCS), several resource blocks, a reference signal received power (RSRP), a reference signal received quality (RSRQ), a signal to noise ratio (SNR), LTE throughput, etc. In an additional example, for example, for the connection between the UE 110 and a Wi-Fi AP, the physical layer metrics that may be evaluated at the UE 110 may include one or more of a MCS, a received signal strength indicator (RSSI), a Wi-Fi multimedia (WMM) profile for quality of service (QoS) support (e.g., AC_VO for voice and AC_VI for VT, etc.), backhaul load, congestion, active duty cycle, etc. The modem metrics may be monitored during periods in which the UE 110 is camped on the first AP to obtain information as to the general connection quality provided by the first AP.

At block 2020, the method 2000 may evaluate one or more service metrics associated with a service hosted by the first AP during execution of the service. For example, in an aspect, the UE 110 and/or the AP selection component 150 may include the evaluating component 152, such as a specially programmed processor module, or a processor executing specially programmed code stored in a memory, to evaluate one or more service metrics associated with the service, e.g., a voice call or a video telephony (VT) call, over a connection between the UE 110 and the AP 105, during execution of the service.

In an aspect, the UE 110 may evaluate any combination of physical, media access control (MAC), link, network, and/or application layer metrics for the connection, e.g., connection/link 135 between the UE 110 and the AP 105. The service metrics being evaluated at the UE 110 for the specific application, e.g., the voice or the VT call, at the UE 110 for the connection between the UE 110 and the AP 105 provide a better mechanism than a simple throughput based mechanism for evaluating a quality of service being provided at the UE 110 by the AP 105. Further, the service metrics for voice and VT calls may be evaluated separately/differently as the requirements for voice and VT calls are different. A threshold requirement (e.g., voice quality) that must be satisfied for providing an acceptable level of service (e.g., QoS) at the UE 110 and over the connection between the UE 110 and the AP 105 may be different for voice and VT calls.

In some other aspects, the service metrics may include physical layer metrics as discussed above referring to block 2010. However, the physical layer metrics monitored and evaluated during hosting of a service by the first AP are service metrics, as opposed to modem metrics which may be evaluated during camping.

In some aspects, the application layer metrics that may be evaluated at the UE 110 may include media metrics, e.g., one or more of real-time transport protocol (RTP) statistics on packet loss, a round trip delay, a jitter (e.g., variable delay), buffer management metrics, a codec rate, a codec redundancy, etc. In some other additional aspects, the network and link layer metrics evaluated at the UE 110 may include one or more of retransmission statistics, a packet loss rate, a packet error rate, a round trip time, etc. The UE 110 may evaluate one or more (e.g., a combination) of the service metrics described above.

At block 2030, the method 2000 may calculate one or more scores for the first AP based on the evaluated modem metrics and the evaluated service metrics. For example, in an aspect, the UE 110 and/or the AP selection component 150 may include the updating component 156, such as a specially programmed processor module, or a processor executing specially programmed code stored in a memory, to calculate one or more scores for the first AP based on the service metrics and the modem metrics The evaluated service metrics and the evaluated modem metrics may be combined or manipulated to generate the one or more scores. The one or more scores may include an instance score or a grade score. The instance score may be generally defined as the score assigned periodically to a call (or session) during the call and/or the grade score may be generally defined as the score assigned at the end of a call observation window, e.g., an "X" number of calls or a threshold number of calls is satisfied. For example, instance scores may be calculated every second or every few seconds during a call and tallied at the end of the call and stored in the AP history table 160. The scoring of instance scores may be for the entire duration of the call or for a partial duration of the call, e.g., if the UE 110 dwells on the AP only for a short period and hands off to another AP (then only the duration of the dwell time is scored for the AP). At the end of the observation window, e.g., end of five calls, a decision may be made based on decisions up to that point. Further, the one or more scores may be associated with a time of day. The AP history table 160 may associate a time of day with a score. For example, an AP (e.g., Wi-Fi AP) that is visited/camped by the UE 110 between 7 AM-9 AM on a week day at a local coffee shop may be marked as "not suitable" for that time duration. This provides for a finer (e.g. more refined or accurate) listing of APs in the AP history table 160 and avoids unnecessary listing APs as not being suitable for long periods of time.

At block 2040, the method 2000 may update the AP history table based on the calculated one or more scores for the AP. For example, in an aspect, the UE 110 and/or the AP selection component 150 may include the updating component 156, such as a specially programmed processor module, or a processor executing specially programmed code stored in a memory, to update an AP history table 160 in a memory (e.g., memory 416 of FIG. 4) of the UE 110 based at least on the determination. In an additional aspect, the UE 110 may update the AP history table 160 indicating whether the first AP is suitable (e.g., allowed to camp for future calls) or not suitable (e.g., barred, prohibited, UE may not camp on this AP for future calls, with certain conditions/restrictions) for providing the service at the UE 110.

For example, based on one or more history observations and the observation, the UE 110 may update the AP history table 160 to allow or disallow (e.g., bar, stop, prevent, etc.) the UE 110 from communicating with the first AP, for example, for future calls, to improve performance at the UE 110. In an aspect, the AP history table 160 may include multiple levels of lists or multiple groups of APs categorized (e.g., organized, assigned, divided, sorted, etc.) based at least on an order of barring. In an example aspect, the UE 110 may organize the APs in the AP history table 160 into three lists, e.g., a gray, a black, or a white list. The UE 110 may initially assign an AP to a gray list and transition the AP to the black list if one or more scores associated with a call between the UE 110 and the AP meets certain criteria (e.g., demote criteria or counter) or transition the AP to the white list if one or more scores associated with the call between the UE 110 and the AP meets certain criteria (e.g., promote criteria or counter). The UE 110 may also update the lists when some criteria associated with the listing has changed.

For instance, the UE 110 may transition APs from one list to another list if improved backhaul quality of an AP improves the QoS provided by the AP (e.g., based on backhaul throughput test or round-trip time (RTT) which determines QoS improvement by deducing the support for QoS improvement notification broadcast by the AP (e.g., Wi-Fi-QoS WMM profile support indications, LTE IMS VoPS indication, etc.)), certain time has passed since last access (e.g., last call), UE 110 determines lower (e.g., lower) access load, etc. For example, the Wi-Fi AP may broadcast channel utilization, station count, admission capacity information, etc. Further the change in broadcast information from the APs regarding improved QoS, e.g., for a Wi-Fi AP may improve QoS support via broadcasting support for WMM QoS profiles or LTE eNB may indicate support for VoPS services. And for threshold level improvement, reduced network and access load or congestion, improved backhaul quality, reduced duty cycle, improved transmission schedule (e.g., better modulation or coding scheme or a better medium access control protocol), or change in conditions that may lead to barring. In an example aspect, one or more APs may be barred because of high mobility as the one or more APs may fall in the transition path (e.g., high mobility) of the UE 110. Optionally, when the UE is stationary or under low mobility, the one or more APs may be considered for service if all other conditions are met. The mobility of the UE 110 may be detected, for example, by a motion processor or a similar component. In another example aspect, external over ride triggers from a user or a peripheral device tethered to the UE may be well.

Figure 21:
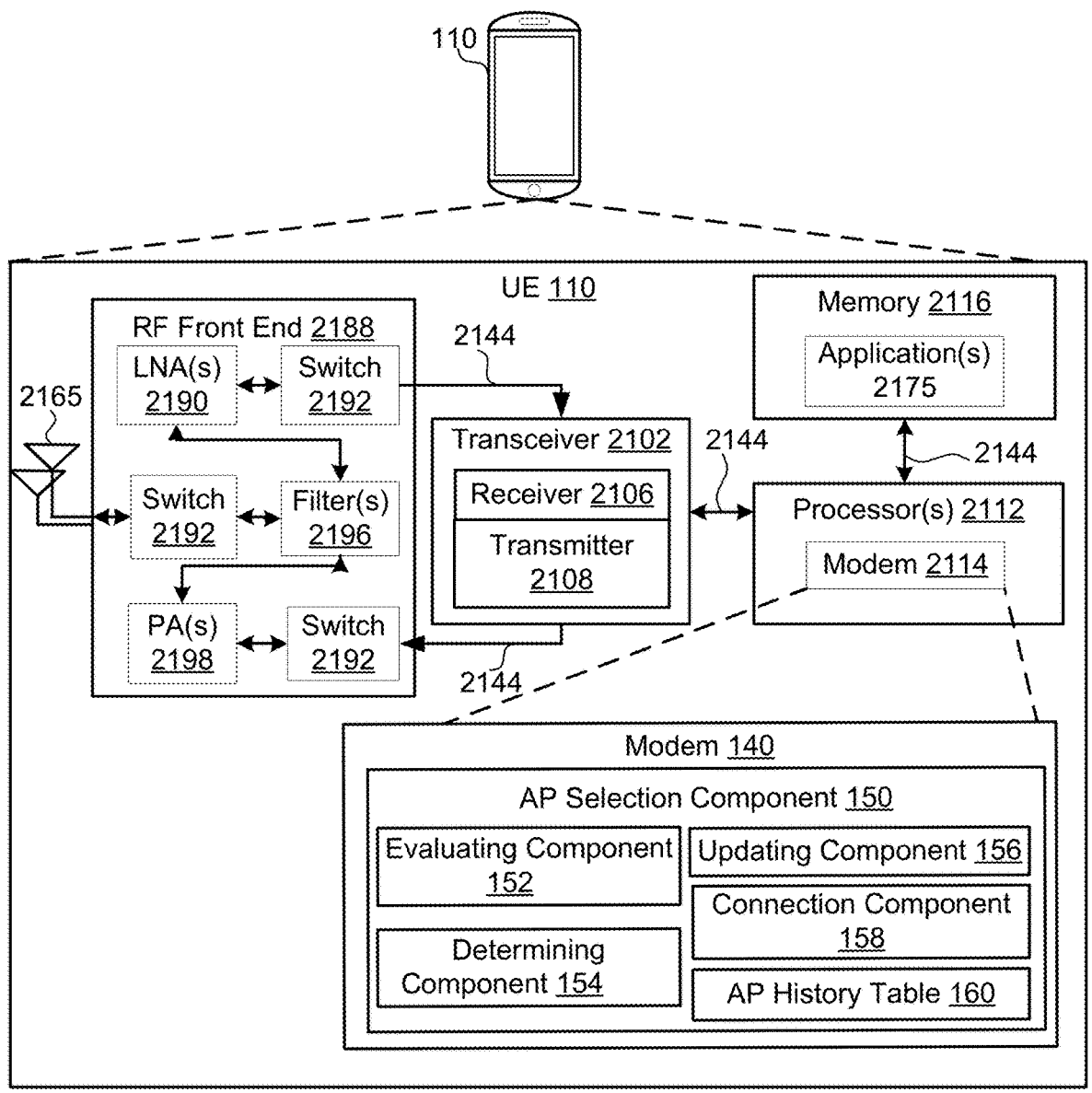
FIG. 21 is a schematic diagram of example components of the UE of FIG. 1.

Referring to FIG. 21, one example of implementing an UE 110 may include many components, some of which have been described above, but including components such as one or more processors 2112 and memory 2116 and transceiver 2102 in communication via one or more buses 2144, which may operate with modem 2114 and AP selection component 150 to enable one or more functions described herein related to selecting an AP for providing a service at the UE in a wireless communication system. Further, the one or more processors 2112, modem 2114, memory 2116, transceiver 2102, radio frequency (RF) front end 2188 and one or more antennas 2165, may be configured to support voice and/or data calls (simultaneously or non-simultaneously) in one or more radio access technologies. In some aspects, the modem 2114 may be the same as or similar to the modem 140 (FIG. 1).

In an aspect, the one or more processors 2112 can include modem 140 that uses one or more modem processors. The functions related to AP selection component 150 may be included in modem 140 and/or processors 2112 and, in an aspect, can be executed by a single processor, while in other aspects, different ones of the functions may be executed by two or more different processors. For example, in an aspect, the one or more processors 2112 may include any one or any combination of a modem processor, or a baseband processor, or a digital signal processor, or a transmit processor, or a receiver processor, or a transceiver processor associated with transceiver 2102. In other aspects, some features of the one or more processors 2112 and/or modem 140 associated with AP selection component 150 may be performed by transceiver 2102.

Also, memory 2116 may be configured to store data used and/or local versions of applications 2175 or AP selection component 150 and/or one or more of its subcomponents being executed by at least one processor 2112. Memory 2116 can include any computer-readable mediums usable by a computer or at least one processor 2112, such as random access memory (RAM), read only memory (ROM), tapes, magnetic discs, optical discs, volatile memory, non-volatile memory, and any combination thereof. In an aspect, for example, memory 2116 may be a non-transitory computer-readable storage medium that stores one or more computer-executable codes defining AP selection component 150 and/or one or more of its subcomponents, and/or data associated therewith, when UE 110 is operating at least one processor 2112 to execute AP selection component 150 and/or one or more of its subcomponents.

Transceiver 2102 may include at least one receiver 2106 and at least one transmitter 2108. Receiver 2106 may include hardware, firmware, and/or software code executable by a processor for receiving data, the code comprising instructions and being stored in a memory (e.g., computer-readable medium). Receiver 2106 may be, for example, a RF receiver. In an aspect, receiver 2106 may receive signals transmitted by at least one AP 105. And receiver 2106 may process such received signals, and also may obtain measurements of the signals, such as, but not limited to, Ec/Io, SNR, RSRP, RSSI, etc. Transmitter 2108 may include hardware, firmware, and/or software code executable by a processor for transmitting data, the code comprising instructions and being stored in a memory (e.g., computer-readable medium). A suitable example of transmitter 2108 may include, but is not limited to, an RF transmitter.

In an aspect, the UE 110 may include RF front end 2188, which may operate in communication with one or more antennas 2165 and transceiver 2102 for receiving and transmitting radio transmissions, for example, wireless communications transmitted by at least one AP 105 or wireless transmissions transmitted by the UE 110. RF front end 2188 may be connected to one or more antennas 2165 and can include one or more low-noise amplifiers (LNAs) 2190, one or more switches 2192, one or more power amplifiers (PAs) 2198, and one or more filters 2196 for transmitting and receiving RF signals.

In an aspect, LNA 2190 can amplify a received signal at a desired output level. In an aspect, each LNA 2190 may have a specified minimum and maximum gain values. In an aspect, RF front end 2188 may use one or more switches 2192 to select a particular LNA 2190 and its specified gain value based on a desired gain value for a particular application.

Further, for example, one or more PA(s) 2198 may be used by RF front end 2188 to amplify a signal for an RF output at a desired output power level. In an aspect, each PA 2198 may have specified minimum and maximum gain values. In an aspect, the RF front end 2188 may use one or more switches 2192 to select a particular PA 2198 and a corresponding specified gain value based on a desired gain value for a particular application.

Also, for example, one or more filters 2196 can be used by the RF front end 2188 to filter a received signal to obtain an input RF signal. Similarly, in an aspect, for example, a respective filter 2196 can filter an output from a respective PA 2198 to produce an output signal for transmission. In an aspect, each filter 2196 can be connected to a specific LNA 2190 and/or PA 2198. In an aspect, RF front end 2188 can use one or more switches 2192 to select a transmit or receive path using a specified filter 2196, LNA 2190, and/or PA 2198, based on a configuration as specified by transceiver 2102 and/or processor 2112.

Transceiver 2102 may be configured to transmit and receive wireless signals through one or more antennas 2165 via RF front end 2188. In an aspect, transceiver may be tuned to operate at specified frequencies so the UE 110 can communicate with, for example, one or more APs 105 or one or more cells associated with one or more APs 105. In an aspect, for example, modem 140 can configure transceiver 2102 to operate at a specified frequency and power level based on the UE configuration of the UE 110 and the communication protocol used by modem 140.

In an aspect, modem 140 can be a multiband-multimode modem, which can process digital data and communicate with transceiver 2102 so the digital data is sent and received using transceiver 2102. In an aspect, the modem 140 can be multiband and be configured to support multiple frequency bands for a specific communications protocol. In an aspect, the modem 140 can be multimode and be configured to support multiple operating networks and communications protocols. In an aspect, the modem 140 can control one or more components of the UE 110 (e.g., RF front end 2188, transceiver 2102) to enable transmission and/or reception of signals from the network based on a specified modem configuration. In an aspect, the modem configuration can be based on the mode of the modem and the frequency band in use. In another aspect, the modem configuration can be based on UE configuration information associated with the UE 110 as provided by the network during cell selection and/or cell reselection.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details to provide an understanding of the described techniques. These techniques, however, may be practiced without these specific details. Sometimes, well-known structures and apparatuses are shown in block diagram form to avoid obscuring the concepts of the described examples.

Information and signals may be represented using any of a variety of technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The illustrative blocks and components described in the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described. A specially-programmed processor may be a microprocessor, but the processor may be any conventional processor, controller, microcontroller, or state machine. A specially-programmed processor may also be implemented as a combination of computing devices, e.g., a combination of a DSP and a microprocessor, multiple microprocessors, one or more microprocessors with a DSP core, or any other such configuration.

The functions described may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of these. Features implementing functions may also be physically at various positions, including being distributed so portions of functions are implemented at different physical locations. Also, as used herein, including in the claims, "or" as used in a list of items prefaced by "at least one of" indicates a disjunctive list so, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any medium that can be accessed by a general purpose or special purpose computer. For example, and not limitation, computer-readable media can comprise RAM, ROM, EEPROM, CD-ROM or other optical disk storage, magnetic disk storage or other magnetic storage devices, or any other medium that can carry or store desired program code means in instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined may be applied to other variations without departing from the spirit or scope of the disclosure. Although elements of the described aspects and/or embodiments may be described or claimed in the singular, the plural is contemplated unless limitation to the singular is explicitly stated. And all or a portion of any aspect and/or embodiment may be utilized with all or a portion of any other aspect and/or embodiment, unless stated otherwise. The disclosure is not to be limited to the examples and designs described but is to be accorded the widest scope consistent with the principles and novel features disclosed.

What is claimed is:

1. A method of communicating between an access point (AP) and a user equipment (UE), comprising:
    identifying, by a UE, a first AP available for communication;
    determining that the first AP is associated with a service cluster based on location;
    determining, by the UE, whether the first AP is suitable based, at least in part, on an indication for the first AP in an AP history table stored in a memory of the UE and one or more cluster-specific suitability parameters, wherein the indication is based on UE-determined metrics determined during one or more prior communications between the UE and the first AP;
    establishing communication between the UE and the first AP, in response to determining that the first AP is suitable;
    identifying, at the UE in response to determining that the first AP is not suitable, a second AP based at least in part on collocated Wi-Fi information in the AP history table for the second AP that the second AP is collocated with or accessible by the first AP, available for communication, and an indication for the second AP in the AP history table stored in the memory of the UE, wherein the indication is based on UE-determined metrics determined during one or more prior communications between the UE and the second AP wherein the second AP provided a service to the UE; and establishing communication between the UE and the second AP in response to identifying of the second AP.

2. The method of claim 1, wherein a radio access technology (RAT) of the first AP is different from a RAT of the second AP.

3. The method of claim 1, further comprising in response to determining that the first AP is not suitable:

identifying, at the UE, that there is no second AP that is available for communication; and establishing communication between the UE and the first AP, in response to identifying that there is no second AP available for communication or based on predefined rules for at least emergency calls or roaming calls.

4. The method of claim 1, wherein identifying the first AP available for communication is in response to receiving a request to initiate a service.

5. The method of claim 1, wherein establishing communication between the UE and the first AP includes one of camping the UE on the first AP or initiating, by the UE, a service to be hosted by the first AP.

6. The method of claim 1, wherein the UE-determined metrics includes one or more of service metrics determined during sessions in which the first AP hosted a service for the UE, modem metrics determined by the UE during prior camping of the UE on the first AP, and an indication of confidence in success of a potential handover.

7. The method of claim 1, further comprising:

evaluating, at the UE, one or more modem metrics during camping of the UE on the first AP;

evaluating, at the UE, one or more service metrics associated with a service hosted by the first AP during execution of the service;

calculating one or more scores for the first AP based, at least in part, on the evaluated modem metrics and the evaluated service metrics; and updating, at the UE, the AP history table based, at least in part, on the calculated one or more scores for the AP.

8. The method of claim 7, further comprising updating the indication in the AP history table indicating whether the first AP is suitable based, at least in part, on the one or more calculated scores or based on changes in broadcast information received from the first AP.

9. The method of claim 8, wherein updating the indication in the AP history table comprises storing the indication in at least one of a white list, a gray list, or a black list.

10. The method of claim 7, wherein calculating the scores comprises at least one of:

calculating an instance score periodically during execution of the service; or calculating a grade score upon ending of the service and upon determination that an observation window threshold is satisfied.

11. The method of claim 1, wherein establishing communications includes establishing a voice call or a video telephony (VT) call or a data call, and wherein the first AP is an eNB or a gNB and the AP is a macro cell, a small cell or a Wi-Fi access point.

12. A user equipment (UE), comprising:
a memory;
a transceiver; and
a processor in communication with the memory, and configured to:
identify a first AP available for communication;
determine that the first AP is associated with a service cluster based on location;
determine whether the first AP is suitable based, at least in part, on an indication for the first AP in an AP history table stored in a memory of the UE and one or more cluster-specific suitability parameters, wherein the indication is based on UE-determined metrics determined during one or more prior communications between the UE and the first AP;
establish communication between the UE and the first AP, in response to determining that the first AP is suitable;
identify, in response to determining that the first AP is not suitable, a second AP based at least in part on collocated Wi-Fi information in the AP history table for the second AP that the second AP is collocated with or accessible by the first AP, available for communication, and an indication for the second AP in the AP history table stored in the memory of the UE, wherein the indication is based on UE-determined metrics determined during one or more prior communications between the UE and the second AP wherein the second AP provided a service to the UE; and
establishing communication between the UE and the second AP in response to identifying of the second AP.

13. The UE of claim 12, wherein a radio access technology (RAT) of the first AP is different from a RAT of the second AP.

14. The UE of claim 12, wherein the processor is further configured to in response to determining that the first AP is not suitable:

identify that there is no second AP that is available for communication; and establish communication between the UE and the first AP, in response to identifying that there is no second AP available for communication or based on pre-defined rules for emergency calls or roaming calls.

15. The UE of claim 12, wherein the processor is further configured such that identifying the first AP available for communication is in response to receiving a request to initiate a service.

16. The UE of claim 12, wherein the processor is configured such that establishing communication between the UE and the first AP includes one of camping the UE on the first AP or initiating, by the UE, a service to be hosted by the first AP.

17. The UE of claim 12, wherein the UE-determined metrics include at least one of service metrics determined during sessions in which the first AP hosted a service for the UE, modem metrics determined by the UE during prior camping of the UE on the first AP, and an indication of confidence in success of a potential handover.

18. The UE of claim 12, wherein the processor is further configured to:

evaluate one or more modem metrics during camping of the UE on the first AP;

evaluate one or more service metrics associated with a service hosted by the first AP during execution of the service;

calculate one or more scores for the first AP based, at least in part, on the evaluated modem metrics and the evaluated service metrics; and update the AP history table based, at least in part, on the calculated one or more scores for the AP.

19. The UE of claim 18, wherein the processor is further configured to update the indication in the AP history table indicating whether the first AP is suitable based, at least in part, on the one or more calculated scores or based on changes in broadcast information received from the first AP.

20. The UE of claim 19, wherein the processor is further configured such that updating the indication in the AP history table comprises storing the indication in at least one of a white list, a gray list, or a black list.

21. The UE of claim 18, wherein the processor is further configured to calculate the scores by at least one of:
   calculating an instance score periodically during execution of the service; or
   calculating a grade score upon ending of the service and upon determination that an observation window threshold is satisfied.

22. A user equipment (UE), comprising:
   means for identifying a first AP available for communication;
   means for determining that the first AP is associated with a service cluster based on location;
   means for determining whether the first AP is suitable based, at least in part, on an indication for the first AP in an AP history table stored in a memory of the UE and one or more cluster-specific suitability parameters, wherein the indication is based on UE-determined metrics determined during one or more prior communications between the UE and the first AP;
   means for establishing communication between the UE and the first AP, in response to determining that the first AP is suitable;
   means for identifying, at the UE in response to determining that the first AP is not suitable, a second AP based at least in part on collocated Wi-Fi information in the AP history table for the second AP that the second AP is collocated with or accessible by the first AP, available for communication, and an indication for the second AP in the AP history table stored in the memory of the UE, wherein the indication is based on UE-determined metrics determined during one or more prior communications between the UE and the second AP wherein the second AP provided a service to the UE; and
   means for establishing communication between the UE and the second AP in response to identifying of the second AP.

23. The UE of claim 22, further comprising:
   means for evaluating one or more modem metrics during camping of the UE on the first AP;
   means for evaluating one or more service metrics associated with a service hosted by the first AP during execution of the service;
   means for calculating one or more scores for the first AP based, at least in part, on the evaluated modem metrics and the evaluated service metrics; and
   means for updating the AP history table based, at least in part, on the calculated one or more scores for the AP.

24. A non-transitory computer-readable medium storing computer code executable by a processor for wireless communications, comprising:
   code for identifying, by a UE, a first AP available for communication;
   code for determining that the first AP is associated with a service cluster based on location;
   for determining, by the UE, whether the first AP is suitable based, at least in part, on an indication for the first AP in an AP history table stored in a memory of the UE and one or more cluster-specific suitability parameters, wherein the indication is based on UE-determined metrics determined during one or more prior communications between the UE and the first AP;
   code for establishing communication between the UE and the first AP, in response to determining that the first AP is suitable;
   code for identifying, at the UE in response to determining that the first AP is not suitable, a second AP based at least in part on collocated Wi-Fi information in the AP history table for the second AP that the second AP is collocated with or accessible by the first AP, available for communication, and an indication for the second AP in the AP history table stored in the memory of the UE, wherein the indication is based on UE-determined metrics determined during one or more prior communications between the UE and the second AP wherein the second AP provided a service to the UE; and
   code for establishing communication between the UE and the second AP in response to identifying of the second AP.

25. The non-transitory computer-readable medium of claim 24, having further stored thereon, code comprising:
   code for evaluating, at the UE, one or more modem metrics during camping of the UE on the first AP;
   code for evaluating, at the UE, one or more service metrics associated with a service hosted by the first AP during execution of the service;
   code for calculating one or more scores for the first AP based, at least in part, on the evaluated modem metrics and the evaluated service metrics; and
   code for updating, at the UE, the AP history table based, at least in part, on the calculated one or more scores for the AP.

26. The UE of claim 22, wherein a radio access technology (RAT) of the first AP is different from a RAT of the second AP.

27. The UE of claim 22, further comprising in response to determining that the first AP is not suitable:
   means for identifying, at the UE, that there is no second AP that is available for communication; and
   means for establishing communication between the UE and the first AP, in response to identifying that there is no second AP available for communication or based on pre-defined rules for at least emergency calls or roaming calls.

28. The non-transitory computer-readable medium of claim 24, wherein a radio access technology (RAT) of the first AP is different from a RAT of the second AP.

29. The non-transitory computer-readable medium of claim 24, having further stored thereon, code comprising in response to determining that the first AP is not suitable:
   code for identifying, at the UE, that there is no second AP that is available for communication; and
   code for establishing communication between the UE and the first AP, in response to identifying that there is no second AP available for communication or based on pre-defined rules for at least emergency calls or roaming calls.

* * * * *